US010009486B2

(12) United States Patent
Ohara

(10) Patent No.: US 10,009,486 B2
(45) Date of Patent: Jun. 26, 2018

(54) OUTPUT SYSTEM, OUTPUT APPARATUS, AND OUTPUT METHOD FOR OUTPUTTING DATA WITH AUTHENTICATION DURING FAILURE EVENTS

(71) Applicant: Kazuki Ohara, Kanagawa (JP)

(72) Inventor: Kazuki Ohara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days. days.

(21) Appl. No.: 15/071,162

(22) Filed: Mar. 15, 2016

(65) Prior Publication Data

US 2016/0277597 A1  Sep. 22, 2016

(30) Foreign Application Priority Data

Mar. 20, 2015 (JP) .................................. 2015058820
Jun. 22, 2015 (JP) .................................. 2015124958

(51) Int. Cl.
*H04N 1/00* (2006.01)
*G06F 3/12* (2006.01)
(Continued)

(52) U.S. Cl.
CPC ......... *H04N 1/0023* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS

2006/0064753 A1  3/2006  Otake et al.
2006/0256370 A1* 11/2006  Murakawa .............. G06F 21/31
                                                            358/1.15
(Continued)

FOREIGN PATENT DOCUMENTS

EP        2256657 A1   12/2010
JP      2014-149870    8/2014

OTHER PUBLICATIONS

European Search Report EP16160292 dated Jun. 8, 2016.

*Primary Examiner* — Miya J Williams
(74) *Attorney, Agent, or Firm* — Duft Bornsen & Fettig LLP

(57) ABSTRACT

An output system includes a terminal apparatus to receive an accumulation instruction from a user, an accumulation apparatus to accumulate first output job information, an output apparatus to acquire data from an accumulation destination specified in the first output job information, and an authentication apparatus to authenticate the user. The output apparatus includes a holder to hold authentication history information of the user with identification information of the user and terminal apparatus, an authentication controller to request, upon detecting failure in the accumulation apparatus or authentication apparatus, the terminal apparatus identified by the identification information utilizing the identification information of the user and terminal apparatus to perform authentication based on the identification information of the user, and an output controller to acquire second output job information from the terminal apparatus succeeded in authentication, acquire data specified in the second output job information from the terminal apparatus, and output the data.

16 Claims, 19 Drawing Sheets

(51) Int. Cl.
*G06F 21/60* (2013.01)
*G06F 21/31* (2013.01)
*G06F 21/44* (2013.01)
*H04L 9/14* (2006.01)
*H04L 9/32* (2006.01)
*H04L 29/06* (2006.01)
*H04N 1/32* (2006.01)
*H04L 9/08* (2006.01)

(52) U.S. Cl.
CPC .......... *G06F 3/1267* (2013.01); *G06F 3/1288* (2013.01); *G06F 21/31* (2013.01); *G06F 21/44* (2013.01); *G06F 21/608* (2013.01); *H04L 9/0822* (2013.01); *H04L 9/14* (2013.01); *H04L 9/32* (2013.01); *H04L 9/3226* (2013.01); *H04L 9/3247* (2013.01); *H04L 9/3297* (2013.01); *H04L 63/06* (2013.01); *H04N 1/00204* (2013.01); *H04N 1/00244* (2013.01); *H04N 1/32272* (2013.01); *H04N 2201/0094* (2013.01)

(56) References Cited

U.S. PATENT DOCUMENTS

| | | | |
|---|---|---|---|
| 2007/0103715 A1* | 5/2007 | Nakata | G06F 3/1203 358/1.14 |
| 2007/0273924 A1* | 11/2007 | Ozawa | G06F 3/1212 358/1.15 |
| 2008/0082858 A1* | 4/2008 | Hasegawa | H04L 41/0681 714/3 |
| 2009/0222914 A1 | 9/2009 | Ozawa | |
| 2010/0306829 A1* | 12/2010 | Nishio | G06F 21/31 726/4 |
| 2012/0162681 A1* | 6/2012 | Tomita | G06F 3/1222 358/1.13 |
| 2014/0298114 A1* | 10/2014 | Aoki | G06F 11/2028 714/48 |
| 2015/0077793 A1 | 3/2015 | Mori | |
| 2016/0277195 A1* | 9/2016 | Maeda | H04L 9/3268 |

* cited by examiner

OUTPUT SYSTEM, OUTPUT APPARATUS, AND OUTPUT METHOD FOR OUTPUTTING DATA WITH AUTHENTICATION DURING FAILURE EVENTS

CROSS-REFERENCE TO RELATED APPLICATION

The present application is based on and claims the benefit of priority of Japanese Priority Application No. 2015-058820 filed on Mar. 20, 2015, and Japanese Priority Application No. 2015-124958 filed on Jun. 22, 2015, the entire contents of which are hereby incorporated herein by reference.

BACKGROUND OF THE INVENTION

1. Field of the Invention

The disclosures discussed herein generally relate to an output system, an output apparatus, an output method, and a non-transitory recording medium storing a program.

2. Description of the Related Art

A pull Printing system is a kind of printing system where a print job registered from a terminal apparatus is temporarily accumulated in a print accumulation apparatus, and an image forming apparatus acquires, upon receiving an instruction from a login user authenticated by an authentication apparatus, the accumulated print job from the print accumulation apparatus to execute printing.

For example, a disclosed related art pull printing system enables a user to initially accumulate print jobs in a server without determining from which printer the user executes printing, and execute the accumulated print jobs from a printer installed in the place where the user has visited (e.g., Patent Document 1).

As noted above, the related art pull printing system temporarily accumulates print jobs, and the image forming apparatus acquires the accumulated print jobs from the print accumulation apparatus to execute printing. Such a system may, however, be unable to execute the print jobs for printing when the print accumulation apparatus has failed. The related art pull printing system may also fail to execute the accumulated print jobs for printing when the authentication apparatus has failed. This is because users of the system generally log into the image forming apparatus via the authentication apparatus.

The above-described obstructive factors to printing may be observed in not only to the printing systems such as pull printing systems but may also be observed in output systems in which users accumulate jobs in an accumulation apparatus to execute the accumulated jobs from output apparatus such as projectors or monitors to output data.

RELATED ART DOCUMENT

Patent Document

Patent Document 1: Japanese Unexamined Patent Application Publication No. 2014-149870

SUMMARY OF THE INVENTION

Accordingly, it is a general object in one embodiment of the present invention to provide a technology capable of outputting data and the like with authentication even when one of the authentication apparatus and the accumulation apparatus fails, which substantially obviates one or more problems caused by the limitations and disadvantages of the related art.

According to an aspect of embodiments, there is provided an output system that includes a terminal apparatus configured to receive an accumulation instruction from a user; an accumulation apparatus configured to accumulate first output job information, in accordance with the received accumulation instruction; an output apparatus configured to acquire output data from an accumulation destination specified in the first output job information to output the acquired output data, in accordance with an output instruction from the user; and an authentication apparatus configured to authenticate the user, where the terminal apparatus, the accumulation apparatus, the output apparatus, and the authentication apparatus are connected via a network. The output apparatus includes a holder configured to hold authentication history information of the user in association with identification information of the user and identification information of the terminal apparatus, an authentication controller configured to request, upon detecting failure in at least one of the accumulation apparatus and the authentication apparatus, the terminal apparatus identified by the identification information of the terminal apparatus to perform authentication based on the identification information of the user, the terminal apparatus being identified by the identification information of the terminal apparatus utilizing the identification information of the user and the identification information of the terminal apparatus in association with the authentication history information of the user, and an output controller configured to acquire second output job information accumulated in the terminal apparatus from the terminal apparatus that has succeeded in the authentication based on the identification information of the user, acquire output data specified in the second output job information from the terminal apparatus, and output the acquired output data.

Other objects, features and advantages of the present invention will become more apparent from the following detailed description when read in conjunction with the accompanying drawings.

DETAILED DESCRIPTION OF THE PREFERRED EMBODIMENTS

Figure 1:
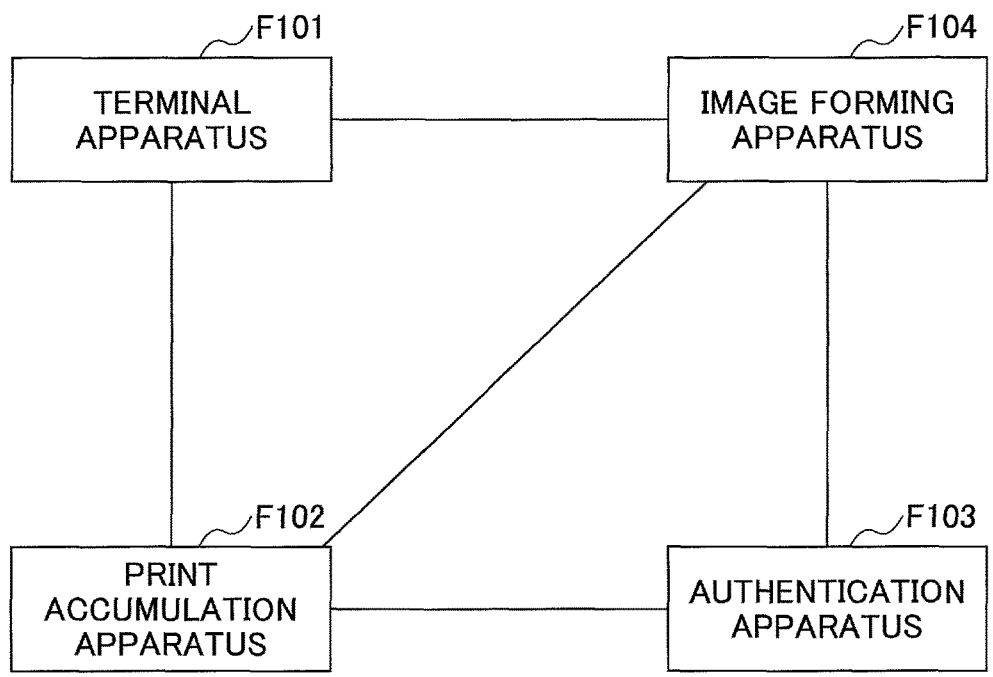
FIG. 1 is a diagram illustrating an overall structure of a printing system according to a first embodiment.

The following illustrates details of embodiments. Note that the embodiments disclosed below illustrate a printing system as an example of an output system; however, the embodiments applied are not limited to the printing system. The disclosed embodiments output system may be applied to any systems, in addition to a projection system or a display system described later, insofar as the systems are configured to output data accumulated in an accumulation destination.
First Embodiment
Overall Configuration of Printing System FIG. 1 illustrates an overall structure of a printing system according to a first embodiment. Note that the following embodiment illustrates a printing process as an example of an outputting process; however, the embodiment applied is not limited to the printing process. The embodiment may be applied to any other processes. For example, the embodiment may be applied to a projecting system to project accumulate data on a terminal apparatus. The printing system of the embodiment is simply an example of an output system configured to output data from an accumulation apparatus to an output apparatus.

The printing system illustrated in FIG. 1 includes a terminal apparatus F101, a print accumulation apparatus F102, an authentication apparatus F103, and an image forming apparatus F104 that are connected in a circular arrangement, where the print accumulation apparatus F102 and the image forming apparatus F104 are connected. The above-described apparatuses are connected by a network. Note that common reference numerals are used in the same or similar components.

Examples of the terminal apparatus F101 may include desk top personal computers (PCs), laptop PCs, smartphones, and tablet terminals that are operated by users. The terminal apparatus F101 is configured to transmit print jobs to the print accumulation apparatus F102 via a Web interface published by a print driver or the print accumulation apparatus F102. The terminal apparatus F101 is also configured to authenticate a user of the terminal apparatus F101 to transmit the print jobs accumulated by the terminal apparatus F101 itself to the image forming apparatus F104.

The print accumulation apparatus F102 is configured to temporarily accumulate the print jobs upon receiving a request from the terminal apparatus F101. The print accumulation apparatus F102 is also configured to cause, when temporarily accumulating a print job, the authentication apparatus F103 to perform authentication using user identification information stated in that print job.

The authentication apparatus F103 is configured to authenticate a user upon receiving requests from the print accumulation apparatus F102 and the image forming apparatus F104. The image forming apparatus F104 is configured to acquire print jobs accumulated by the users from the print accumulation apparatus F102 or the terminal apparatus F101 to execute printing.

The image forming apparatus F104 is provided with a built-in or an external reader apparatus configured to perform communications with an information storage medium. The image forming apparatus F104 may thus perform communications with the information storage medium using the attached reader. Respective examples of the reader and the information storage medium include an IC card reader and an IC card. The image forming apparatus F104 may also transmit authentication requests to the authentication apparatus F103 and the terminal apparatus F101 using user identification information read from the information storage medium or information storage medium identification information.

Figure 2:
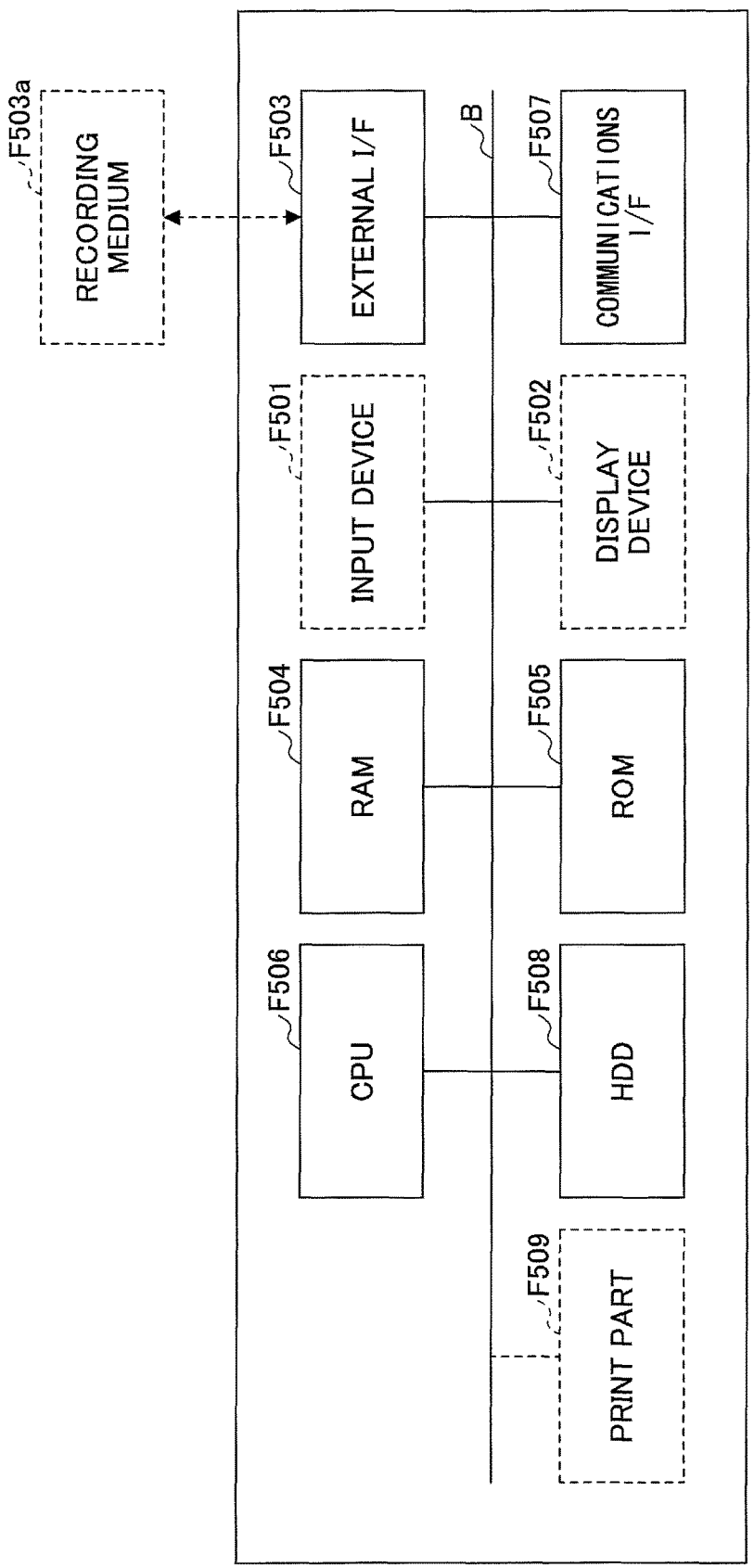
FIG. 2 is a schematic diagram illustrating a hardware structure of a terminal apparatus, a print accumulation apparatus, an authentication apparatus, and an image forming apparatus for use in the printing system illustrated in FIG. 1.

Note that the terminal apparatus F101 is a specific example of a user terminal configured to execute an accumulating process of output data in the first embodiment. Similarly, the print accumulation apparatus F102 is a specific example of an accumulation apparatus configured to accumulate output information. The image forming apparatus F104 is a specific example of an output apparatus configured to output the output data. The authentication apparatus F103 is a specific example of an authentication apparatus configured to perform authentication in response to an authentication request.
Hardware Configuration FIG. 2 is a schematic diagram illustrating a hardware structure of a terminal apparatus, a print accumulation apparatus, an authentication apparatus, and an image forming apparatus for use in the printing system illustrated in FIG. 1.
Terminal Apparatus The terminal apparatus F101 includes a central processing unit (CPU) F506, a random access memory (RAM) F504, an input device F501, an external I/F F503, a hard disk drive (HDD) F508, a read only memory (ROM) F505, a display device F502, and a communications I/F F507 that are connected via a bus line.

The CPU F506 is a processor configured to read programs or data from a storage device such as the ROM F505 or the HDD F508 to be loaded in the RAM F504, and execute the loaded programs or data to integrally control the terminal apparatus F101. An example of the CPU F506 includes a microprocessor. The RAM F504 is a semiconductor device configured to temporarily store control programs, and an example of the RAM F504 includes a dynamic random-access memory (DRAM).

The input device F501 is a device configured to allow a user to input operations signals, and examples of the input device F501 include a keyboard, a mouse, and a touch panel. The external I/F F503 is a device configured to communicate data with a recording medium F503a of an external circuit.

Examples of the recording medium F503a include a flexible disk, a compact disc (CD), a digital versatile disk (DVD), a secure digital (SD) memory card, and a USB memory card. The HDD F508 is a nonvolatile storage device having storage capacity greater than that of the RAM F504, and is configured to store image data and the like.

The ROM F505 is a nonvolatile semiconductor device configured to maintain programs or data even if the power is turned off. An example of the ROM F505 includes a mask ROM. The ROM 505 is configured to store programs and data such as a basic input/output system (BIOS), operating system (OS) settings, network settings, and the like that are executed at the startup of the terminal apparatus F101.

The display device F502 is a device including a display or the like configured to display results of the executed processes to allow users to visually acknowledge their operations statuses. An example of the display device F502 includes a liquid crystal display device. The communications I/F F507 is an interface for connecting to a network. An example of the communications I/F F507 includes a modem.

Print Accumulation Apparatus

The print accumulation apparatus F102 is generally called a print server, and includes a CPU F506, a RAM F504, a HDD F508, a ROM F505, and a communications I/F F507 that are connected via a bus line. The print accumulation apparatus F102 is configured to hold print data and print job information. The print server apparatus 102 is configured to transmit print data or print job information to the image forming apparatus 104 based on a request from the image forming apparatus 104.

Authentication Apparatus

The authentication apparatus F103 is a device including a CPU F506, a RAM F504, a HDD F508, a ROM F505, and a communications I/F F507 that are connected via a bus line. The authentication apparatus F103 is configured to perform authentication based on a request from the terminal apparatus F101 or the like.

Image Forming Apparatus

The image forming apparatus F104 is a device including a CPU F506, a RAM F504, a HDD F508, a ROM F505, a communications I/F F507, and a print part F509 that are connected via a bus line. Examples of the image forming apparatus F104 include a printer, a copier, a multifunctional peripheral and the like connected to the terminal apparatus F101.

Functional Components of Printing System

Figure 3:
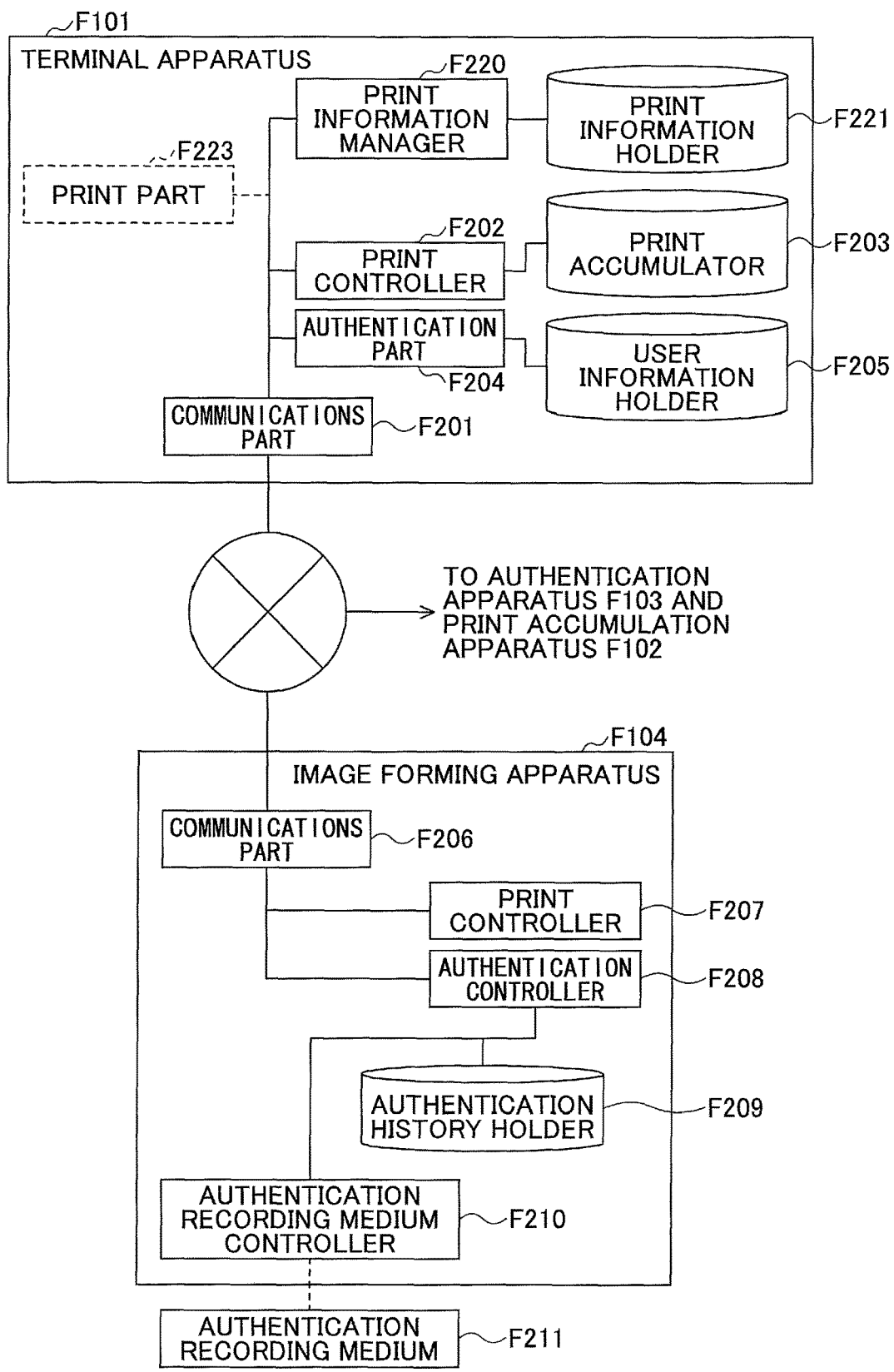
FIG. 3 is a functional block diagram illustrating the terminal apparatus, and the image forming apparatus for use in the printing system illustrated in FIG. 1.

FIG. 3 is a functional block diagram illustrating components of the terminal apparatus and the image forming apparatus for use in the printing system illustrated in FIG. 1.

Terminal Apparatus

The terminal apparatus F101 includes a print information manager F220, a print information holder F221, a print controller F202, a print accumulator F203, an authentication part F204, a user information holder F205, and a communications part F201 that are connected by a bus line. Note that the terminal apparatus F101 may include a print part F223.

The print information manager F220 is configured to manage print job information held in the print information holder F221. The print information manager F220 is configured to generate, upon receiving a print job registration instruction based on a user's operation, print job information of a print job and register the generated print job information in the print information holder F221 based on the received registration instruction.

TABLE 1

| JOB ID | JOB NAME | PATH | DOCUMENT INFORMATION |
|---|---|---|---|
| PJ100 | MEMO.txt | C:¥Users¥Tanaka¥MEMO.txt | bw/duplex/a4 |
| PJ101 | FINANCIAL REPORT.pdf | D:¥REPORT DOCUMENT¥ FINANCIAL REPORT.pdf | fullcolor/duplex/a4/staple:t1 |
| PJ102 | REPORT.pdf | C:¥tmp¥spool¥PJ102 | |

Table 1 illustrates an example of a table including print job information managed within the terminal apparatus F101. The print job information of Table 1 is hereinafter referred to as terminal apparatus internal print job information.

The terminal apparatus F101 in this embodiment selects, upon receiving a print job registration instruction from a user, one of the terminal apparatus F101 and the print accumulation apparatus F102 as an accumulation destination apparatus to accumulate print data. When the print data are accumulated in the selected one of the terminal apparatus F101 and the print accumulation apparatus F102, the print information manager F220 generates print job information as illustrated in Table 1.

Table 1 includes items of a job ID, a job name, a path, and a document name.

The job ID is identification information generated by the print accumulation apparatus F102, and is configured to uniquely identify a print job. Alternatively, the terminal apparatus F101 may generate the job ID insofar as the terminal apparatus F101 is able to secure the uniqueness of the print job. The job name indicates a file name of a print job. The path specifies a storage location of a real file subject to printing (a storage location of original data at the time of generating print data), or information indicating a storage location of print data. When the path indicates the storage location of the original data at the time of generating print data, there is a possibility that the real file subjected to printing has been moved or removed by a user.

The document information includes setting information of a print job such as monochrome (bw), color (full color), a single side, duplex sides (duplex), a document size (a4), and an upper-left staple (staple: t1). Note that the print settings are not limited to those illustrated in Table 1, and may further include an aggregation setting, a punching setting, and the like.

There are two types of print data that are managed by the print job information illustrated in Table 1. A first one indicates print data of printable form converted from data subjected to printing (an original file), which is a file converted into PJL by a printer driver. A second one indicates data subjected to printing (an original file that is unconverted into a printable form).

Note that PJ100 and PJ101 of Table 1 indicate information when the print accumulation apparatus F102 accumulates print data. PJ102 of Table 1 indicates information when the terminal apparatus F101 accumulates print data.

The paths of the PJ100 to PJ101 indicate respective paths of real files stored in the HDD F508 within the terminal apparatus F101. The path of the PJ102 indicates a path of print data (generated from the original data) stored in the HDD F508 within the terminal apparatus F101.

The terminal apparatus F101 in the first embodiment registers a storage location of the original data of the print data as a path of the print job information when selecting the print accumulation apparatus F102 as an accumulation destination for the print data. The original data of the print data indicate data subjected to printing instructed by a user of the terminal apparatus F101. On the other hand, the terminal apparatus F101 registers an accumulated location of the print data generated from the data subjected to printing as a path of the print job information when selecting the terminal apparatus F101 as an accumulation destination for the print data.

Note that when the terminal apparatus F101 accumulates the print data, the print data include the document information. The document information of the PJ102 is thus blank in Table 1. The document information of the PJ102 may include information instead of being blank.

The print controller F202 performs control to transmit the print job to the print accumulation apparatus F102 or the image forming apparatus F104, or control to accumulate the print job in the print accumulator F203, in response to a user's print request. The print accumulator F203 is configured to accumulate print data.

The print controller F202 acquires a path of print job information from the print information manager F220 to acquire print data in response to a print job acquiring request. When the acquired data are print data, the print controller F202 transmits the acquired print data to a request source of the print job acquiring request. When the acquired data are data subjected to printing (original data), the print controller F202 generates print data from the data subjected to printing and subsequently transmits the generated print data to a request source of the print job acquiring request.

The authentication part F204 performs user authentication using user information held in the user information holder F205 in response to an authentication request from the image forming apparatus F104. The user information holder F205 is configured to hold users' public keys for encrypting users' print jobs. The authentication part F204 is configured to generate a shared key.

The authentication part F204 may be able to verify a signature generated by the later-described authentication recording medium F211 using the user's public key held by the user information holder F205. The authentication part F204 is also configured to decrypt the data encrypted with the shared key. The user information holder F205 is configured to hold user information of the user who operates the terminal apparatus F101 in advance. The user information holder F205 is configured to hold public keys corresponding to secret keys held by the authentication recording medium F211.

The communications part F201 includes a function to allow the terminal apparatus F101 to perform communications with the print accumulation apparatus F102, the image forming apparatus F104, and the authentication apparatus F103.

Print Accumulation Apparatus

TABLE 2

| JOB ID | USER ID | JOB NAME | PATH |
|---|---|---|---|
| PJ100 | Tanaka | MEMO.txt | E:¥spool¥X28xjiYLj¥PJ100 |
| PJ101 | Tanaka | FINANCIAL REPORT.pdf | E:¥spool¥X28xjiYLj¥PJ101 |
| PJ102 | Tanaka | REPORT.pdf | 4yJV7CgZ4fKrgPdQKmyBCa |

Table 2 illustrates an example of a table including print job information managed within the print accumulation apparatus F102. The print job information of Table 2 is hereinafter referred to as print accumulation apparatus internal print job information.

Table 2 includes items of a job ID, a user ID, a job name, and a path. The print job information illustrated in Table 2 is generated and registered in the print accumulation apparatus F102, based on the print job transmitted from the terminal apparatus F101 in response to the user's print job registration instruction.

The job ID is identification information generated by the print accumulation apparatus F102, and is configured to uniquely identify a print job. The job ID of Table 2 is synchronized with the job ID of Table 1. The common job IDs indicate that the common job IDs are in association with the same print job.

The user ID is an identifier of the user who has transmitted the print job using the terminal apparatus F101. The job name indicates a file name of a print job. The path indicates a storage location of the print data of the print job or a record of an encryption identifier of the terminal apparatus F101.

The print accumulation apparatus F102 manages the print data of the print job, of which the print accumulation apparatus F102 is selected as the accumulation destination for the print data, and a storage location of the print data is recorded in a path of the print job information.

On the other hand, the terminal apparatus F101 manages the print data of the print job, of which the terminal apparatus F101 is selected as the accumulation destination for the print data, and an encryption identifier of the terminal apparatus F101 that has stored the print data is recorded in a path of the print job information. The encryption identifier of the terminal apparatus F101 is identification information identifying the terminal apparatus F101 (e.g. IP address), which is encrypted with a public key associated with the user ID.

Figure 4:
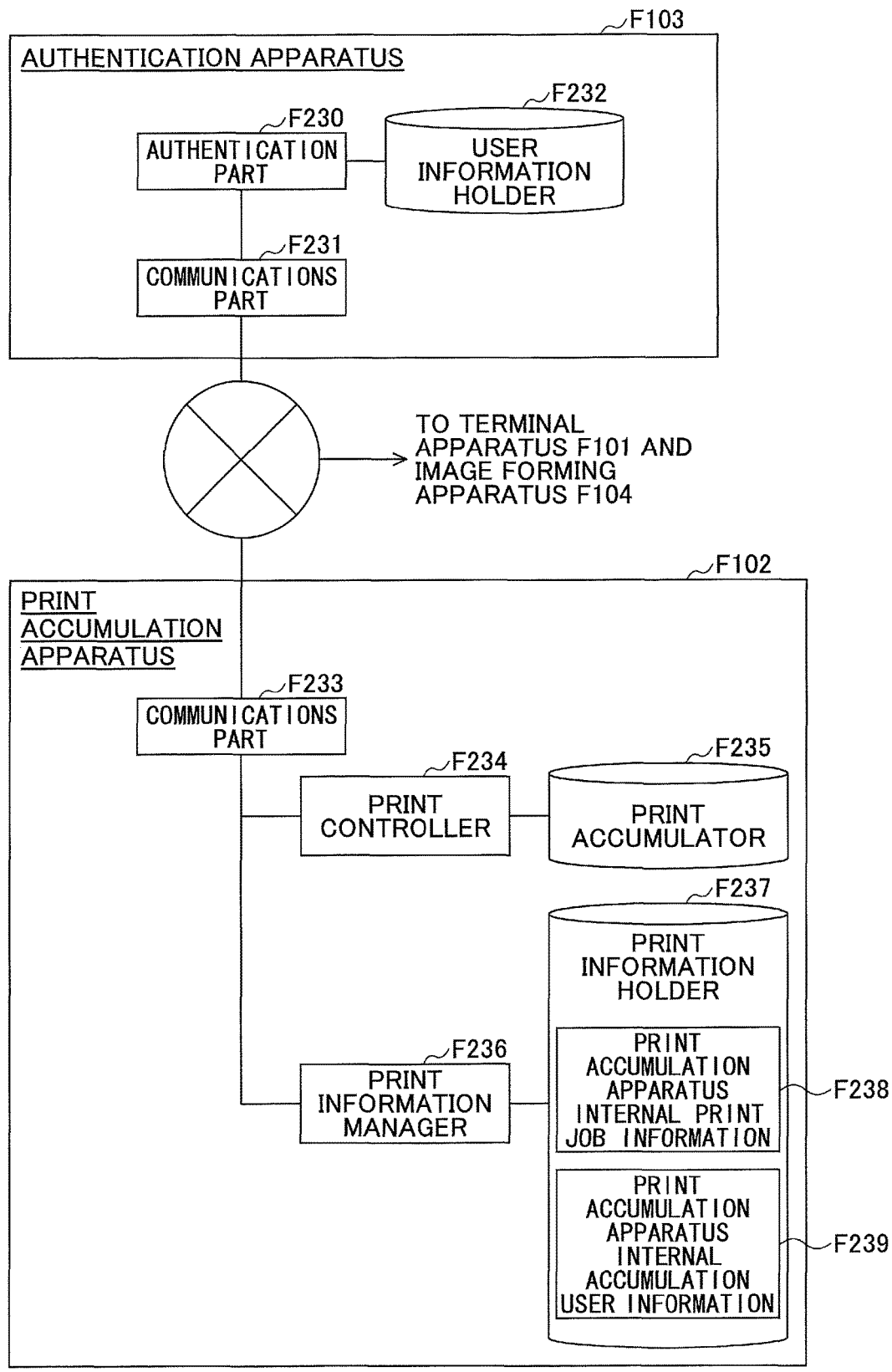
FIG. 4 is a functional block diagram illustrating the print accumulation apparatus and the authentication apparatus for use in the printing system illustrated in FIG. 1.

FIG. 4 is a functional block diagram illustrating the print accumulation apparatus, and the authentication apparatus for use in the printing system illustrated in FIG. 1. The print accumulation apparatus F102 includes a communications part F233, a print controller F234, a print accumulator F235, a print information manager F236, and print information holder F237. The print information holder F237 is configured to hold print accumulation apparatus internal print job information F238 and print accumulation apparatus internal accumulation user information F239.

The communications part F233 includes a function to allow the print accumulation apparatus F102 to perform communications with the terminal apparatus F101, the image forming apparatus F104, and the authentication apparatus F103. The print controller F234 is configured to accumulate print data into the print accumulator F235. The print accumulator F235 is configured to accumulate print data.

The print information manager F236 is configured to manage print accumulation apparatus internal print job information F238 and print accumulation apparatus internal accumulation user information F239 held in the print information holder F237. The terminal apparatus internal print job information F238 indicates information included in Table 3. The print accumulation apparatus internal accumulation user information F239 indicates information included in Table 4.

Note that the difference between the print accumulation apparatus internal print job information of Table 2 and the terminal apparatus internal print job information of Table 1 is that the print accumulation apparatus internal print job information of Table 2 further includes an item of the user ID. The print accumulation apparatus internal accumulation user information F239 of Table 2 includes the item of user ID because the print accumulation apparatus F102 manages a large amount of user information.

TABLE 3

| USER ID | CLIENT |
|---------|--------|
| Tanaka  | 4yJV7CgZ4fKrgPdQKmyBCa |
| Suzuki  | FDizkrtK5jH3UzfDGSLzuQ |

Table 3 illustrates an example of a table including print accumulation apparatus internal accumulation user information F239. The print accumulation apparatus internal accumulation user information F239 illustrated in Table 3 is generated when the print accumulation apparatus F102 accumulates the print job.

Table 3 includes items of a user ID and a client. The user ID is an identifier of the user who has transmitted the print job using the terminal apparatus F101. The client is an encryption identifier of the terminal apparatus F101.

Table 2 is held as the terminal apparatus internal print job information F238 in the print information holder F237. Table 3 is held as the print accumulation apparatus internal accumulation user information F239 in the print information holder F237.

Authentication Apparatus apparatus F103. Note that the client column is configured to be updated upon receiving a report from the print accumulation apparatus F102.

The user ID is an identifier of the user who has transmitted the print job using the terminal apparatus F101. The client illustrated in Table 4 is an encryption identifier of the terminal apparatus F101. The client item is not registered for a user who does not use the terminal apparatus F101.

The copying authorization indicates authorization to access and use a copying function of the image forming apparatus F104 indicated by the user ID. The printing authorization indicates authorization to access and use a printing function of the image forming apparatus F104 indicated by the user ID. The mail address indicates a user's mail address indicated by the user ID. The authentication apparatus internal user information may further include information associated with the user other than the above-described mail address.

Note that the item "client" included in the authentication apparatus internal user information of Table 4 is not registered in advance in the authentication apparatus F103, but will be registered in the authentication apparatus F103. Upon receiving a user ID "Tanaka" and an encryption identifier of the terminal apparatus F101, the authentication apparatus F103 verifies whether a user having the user ID "Tanaka" exists in the authentication apparatus internal user information of Table 4.

When the authentication apparatus internal user information of Table 4 includes user information having the user ID "Tanaka", the authentication apparatus F103 writes encryption identifier of the terminal apparatus F101 in the client item. The information of the client item may be registered in the authentication apparatus internal user information of Table 4 every time a user ID and an encryption identifier of the terminal apparatus F101 is received, or plural pieces of information may be registered simultaneously.

The authentication apparatus internal user information of Table 4 indicates an example of the authentication apparatus internal user information that does not register the client item for user information having a user ID "Satoh".

The authentication apparatus F103 is, as illustrated in FIG. 4, connected to the print accumulation apparatus F102, the terminal apparatus F101, and the image forming apparatus F104 via a network. The authentication apparatus F103 includes an authentication part F230, a user information holder F232, and a communications part F231. The user information holder F232 is configured to hold the authentication apparatus internal user information illustrated in Table 4.

Image Forming Apparatus

The image forming apparatus F104 is, as illustrated in FIG. 3, connected to the terminal apparatus F101, the authentication apparatus F103, and the print accumulation apparatus F102 via the network. The image forming appa-

TABLE 4

| USER ID | CLIENT | COPYING AUTHORIZATION | PRINTING AUTHORIZATION | MAIL ADDRESS |
|---------|--------|----------------------|------------------------|--------------|
| Tanaka  | 4yJV7CgZ4fKrgPdQKmyBCa | ALL | TWIN | tanaka@foo.cojp |
| Satoh   |        | ALL | ALL | satoh@foo.cojp |
| Suzuki  | FDizkrtK5jH3UzfDGSLzuQ | BW | BW | suzuki@foo.cojp |

Table 4 illustrates an example of a table including authentication apparatus internal user information. Table 4 includes items of a job ID, a client, copying authorization, printing authorization, and a mail address. The authentication apparatus internal user information illustrated in Table 4 indicates user information registered in advance in the authentication ratus F104 includes a communications part F206, a print controller F207, an authentication controller F208, an authentication history holder F209, and an authentication recording medium controller F210 configured to perform communications with the authentication recording medium F211.

The communications part F206 includes a function to allow the image forming apparatus F104 to perform communications with the terminal apparatus F101, the print accumulation apparatus F102, and the authentication apparatus F103. The print controller F207 is configured to acquire a print job from the terminal apparatus F101 or the print accumulation apparatus F102 to execute printing. The authentication controller F208 is configured to perform authentication with respect to the terminal apparatus F101 or the print accumulation apparatus F102 using the authentication recording medium controller F210 and the authentication history holder F209.

The authentication controller F208 is configured to perform control authorization to access and use the image forming apparatus F104. The authentication history holder F209 is configured to hold user authentication history information illustrated in Table 5 when the image forming apparatus F104 performs authentication with respect to the authentication apparatus F103.

TABLE 5

| No. | USER ID | CLIENT | COPYING AUTHORIZATION | PRINTING AUTHORIZATION | MAIL ADDRESS |
|---|---|---|---|---|---|
| 1 | Tanaka | 4yJV7CgZ4fKrgPdQKmyBCa | ALL | TWIN | tanaka@foo.cojp |
| 2 | Satoh | | ALL | ALL | satoh@foo.cojp |
| 3 | Suzuki | FDizkrtK5jH3UzfDGSLzuQ | BW | BW | suzuki@foo.cojp |

Table 5 illustrates an example of a table including image forming apparatus internal user authentication history information. The image forming apparatus internal user authentication history information of Table 5 is stored in the authentication history holder F209 of the image forming apparatus F104. The image forming apparatus F104 generates a record of image forming apparatus internal user authentication history information when a user's log-in has succeeded.

Table 5 includes items of "No.", a job ID, a client, copying authorization, printing authorization, and a mail address. The item "No." indicates the order of generating the authentication. The user ID is an identifier of the user who has logged into the terminal apparatus F101. The client illustrated in Table 5 is an encryption identifier of the terminal apparatus F101. The encryption identifier of the terminal apparatus F101 is acquired from an authentication response from the authentication apparatus F103.

The authentication recording medium controller F210 is configured to read the user identification information such as the user ID from the authentication recording medium F211, and transfer the read user identification information to the authentication controller F208. The authentication recording medium controller F210 is configured to encrypt the data received from the authentication controller F208 or decrypt the encrypted data using the authentication recording medium F211.

The authentication recording medium F211 is configured to store the user identification information. An example of the authentication recording medium F211 includes an IC card. The authentication recording medium F211 includes a secret key corresponding to the user ID, and may optionally add a signature to the data or encrypt the data.

Overall Process Flow of Printing System

Figure 5:
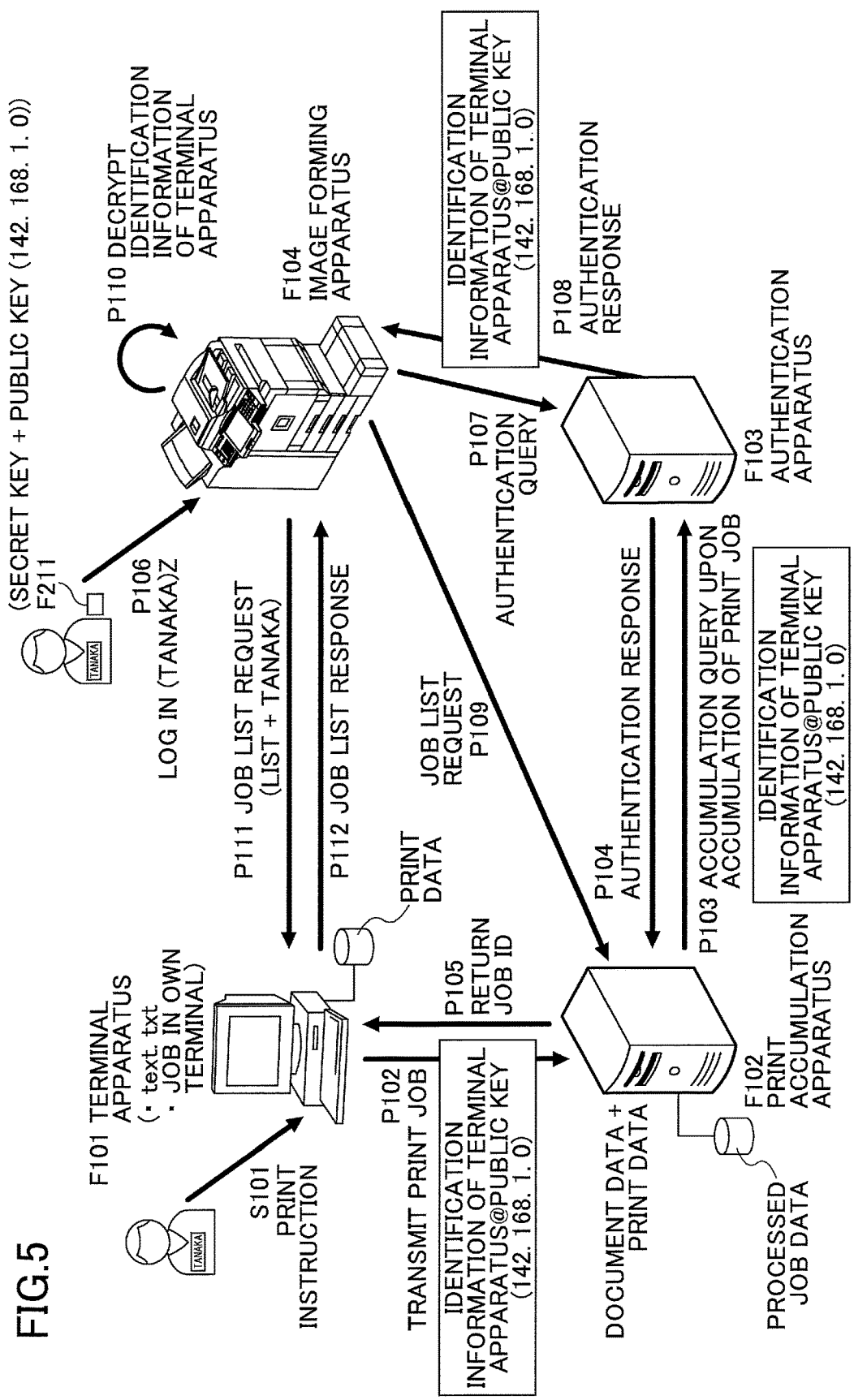
FIG. 5 is a descriptive diagram illustrating a process flow when failure has occurred in the printing system illustrated in FIG. 1.

FIG. 5 is a descriptive diagram illustrating a process flow when failure has occurred in the printing system illustrated in FIG. 1. FIG. 5 illustrates an outline when failure (breakdown) has occurred in the print accumulation apparatus F102 to simplify the illustration. However, the present embodiment assumes that failure may occur in one of the print accumulation apparatus F102 and the authentication apparatus F103.

In P101, a user (e.g., Mr. Tanaka) transmits a print instruction to the terminal apparatus F101. In P102, the terminal apparatus F101 transmits information having an IP address of the terminal apparatus F101 encrypted by using the preregistered user ID and a public key corresponding to the user ID, and a print job to the print accumulation apparatus F102. The information having the encrypted IP address is an example of the information of the terminal apparatus F101 encrypted with the public key corresponding to the user identification information.

In P103, the print accumulation apparatus F102 transmits to the authentication apparatus F103 an inquiry about whether the printing system has registered the user ID of the user (Mr. Tanaka). The print accumulation apparatus F102 transmits to the authentication apparatus F103 information having the IP address of the terminal apparatus F101 encrypted with a public key corresponding to the user ID of the user (Mr. Tanaka) simultaneously with the transmission of the above inquiry.

In P104, the authentication apparatus F103 verifies whether the authentication apparatus internal user information illustrated in Table 1 includes information about Mr. Tanaka. When the authentication apparatus internal user information includes information about Mr. Tanaka, the authentication apparatus F103 adds an encryption identifier of the terminal apparatus F101 transmitted from the print accumulation apparatus F102 to the client column of the authentication apparatus internal user information. The authentication apparatus F103 subsequently returns a response of "authentication OK" to the print accumulation apparatus F102.

In P105, the print accumulation apparatus F102 that has received the response of the "authentication OK" stores the print job in the print accumulation apparatus F102 to generate print accumulation apparatus internal print job information illustrated in Table 2. The print accumulation apparatus F102 also generates print accumulation apparatus internal user information illustrated in Table 3.

In P106, the user (Mr. Tanaka) attempts to log into the image forming apparatus F104 in order to output the print job from the image forming apparatus F104. In P107, the image forming apparatus F104 transmits to the authentication apparatus F103 an inquiry about whether the printing system has registered the user ID of the user (Mr. Tanaka) who has transmitted a login request.

In P108, the authentication apparatus F103 verifies whether the authentication apparatus internal user information includes the user ID of the user (Mr. Tanaka) of which the authentication apparatus F103 has received an authentication inquiry from the image forming apparatus F104. When the authentication apparatus internal user information includes the user ID of the above user (Mr. Tanaka) inquired about, the authentication apparatus F103 returns a response of "authentication OK" together with the authentication apparatus internal user information of the user inquired.

In P109, the image forming apparatus F104 that has received the response of "authentication OK" generates image forming apparatus internal user authentication history information illustrated in Table 5 from the received authentication apparatus internal user information. The image forming apparatus F104 subsequently transmits a job list acquisition request (job list request) to the print accumulation apparatus F102 using the user ID.

Note that the embodiment assumes that failure has occurred in the print accumulation apparatus F102 before the job list request is received from the image forming apparatus F104. Since failure has occurred in the print accumulation apparatus F102, the print accumulation apparatus F102 does not transmit a response to the job list request from the image forming apparatus F104.

The image forming apparatus F104 that has not received from the print accumulation apparatus F102 a response to the job list request acquires user authentication history information of the login user (Mr. Tanaka) from the image forming apparatus internal user authentication history information of Table 5.

In P110, the image forming apparatus F104 decrypts an encryption identifier of the terminal apparatus F101 registered in the client column of the user authentication history information using a secret key of the login user (Mr. Tanaka) acquired from the authentication recording medium F211. The image forming apparatus F104 may be able to acquire the IP address of the terminal apparatus F101.

In P111, the image forming apparatus F104 transmits a job list acquisition request (job list request) to the terminal apparatus F101 using the IP address of the terminal apparatus F101. The terminal apparatus F101 performs authentication using information included in the job list request. Details of this process will be given later. When the authentication has succeeded, the terminal apparatus F101 generates a job list from the terminal apparatus internal print job information of Table 1, and returns the generated job list as a response to the job list request.

Operations of Printing System

Accumulation Process of Print Data

Figure 6:
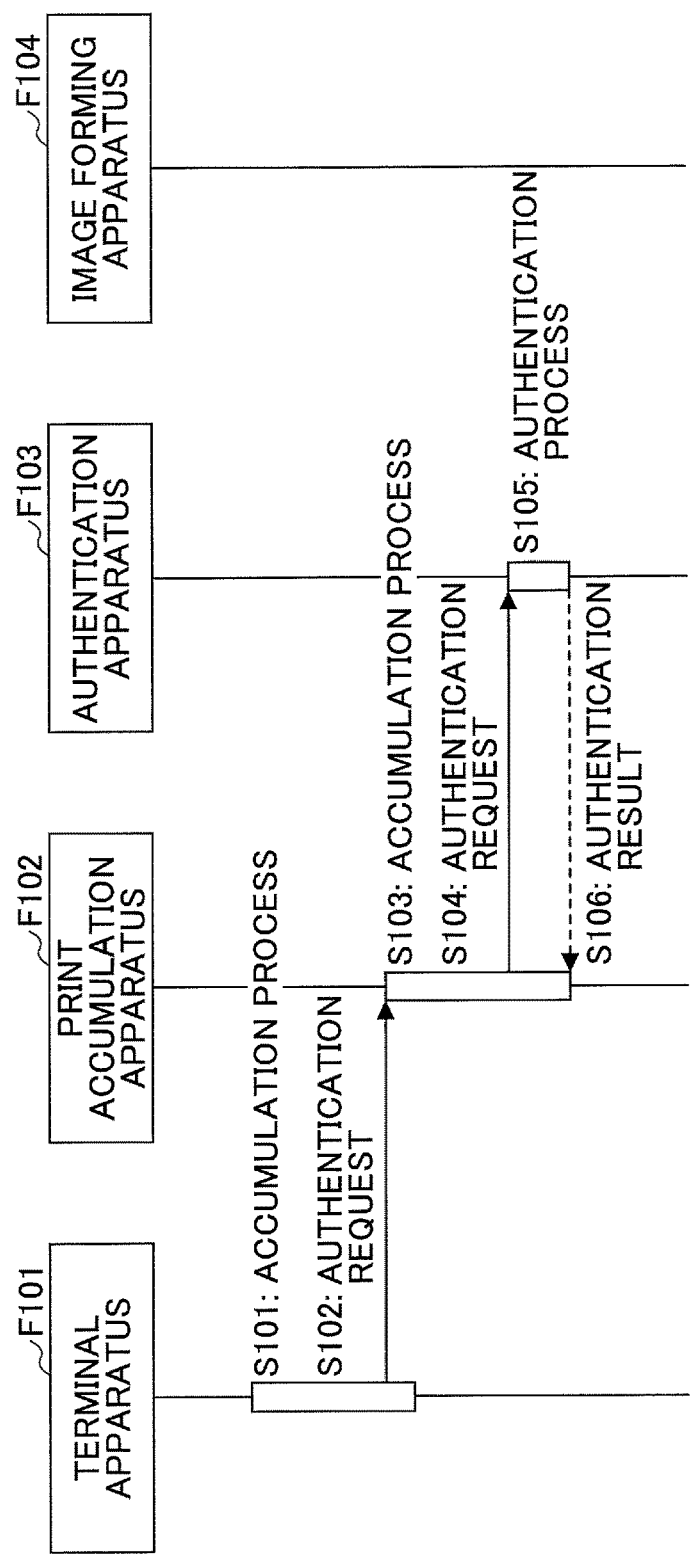
FIG. 6 is a sequence diagram illustrating print data accumulating operations of the printing system illustrated in FIG. 1.

FIG. 6 is a sequence diagram illustrating print data accumulating operations of the printing system illustrated in FIG. 1.

In step S101, the user operates the terminal apparatus F101 to transmit a print request from the printer driver or the like for a pull printing system. The print controller F202 that has received the print request from the user starts an accumulation process. When the print controller F202 accumulates print data in the terminal apparatus F101, the print controller F202 accumulates print data in the print accumulator F203.

In step S102, the terminal apparatus F101 transmits a print job to the print accumulation apparatus F102 to request the print accumulation apparatus F102 to accumulate the print job. When the terminal apparatus F101 accumulates print data, the terminal apparatus F101 requests the print accumulation apparatus F102 to accumulate print job information. On the other hand, when the print accumulation apparatus F102 accumulates the print data, the terminal apparatus F101 requests the print accumulation apparatus F102 to accumulate print job information and print data.

In step S103, the print accumulation apparatus F102 performs print jog accumulation process of the print job requested from the terminal apparatus F101. The print accumulation apparatus F102 analyses the print job received from the terminal apparatus F101 in the print job accumulation process of step S103, and acquires the user ID of the user who has transmitted the print request.

In P104, the print accumulation apparatus F102 transmits to the authentication apparatus F103 an authentication request to inquire about whether the printing system has registered the user ID of the user who has transmitted the print request.

In step S105, the authentication apparatus F103 performs an authentication process using the authentication apparatus internal user information of Table 4. In step S106, the authentication apparatus F103 returns an authentication result to the print accumulation apparatus F102. When the authentication result indicates "NG" (failure), the print accumulation apparatus F102 will not perform the print job accumulation process for security protection. When the authentication result indicates "OK" (success), the print accumulation apparatus F102 accumulates the print job and generates a job ID of the accumulated print job. The print accumulation apparatus F102 subsequently generates print accumulation apparatus internal print job information and print accumulation apparatus internal accumulation user information to hold the generated print accumulation apparatus internal print job information and the generated print accumulation apparatus internal accumulation user information in the print information holder F237. The print accumulation apparatus F102 that has accumulated the print job returns the user information including the user's authorization and a successful accumulation report to the terminal apparatus F101.

The terminal apparatus F101 causes the user information holder F205 to hold the user information including the user's authorization returned form the print accumulation apparatus F102. When the terminal apparatus F101 receives the successful accumulation report, the terminal apparatus F101 generates the terminal apparatus internal print job information of Table 1, and causes the print information holder F221 to hold the generated terminal apparatus internal print job information.

The authentication apparatus F103 returns an authentication result to the print accumulation apparatus F102 as well as adding the encryption identifier of the terminal apparatus F101 included in the authentication request received from the 102 to the client column of the authentication apparatus internal user information of Table 4 in step S106.

Execution of Printing

Figure 7:
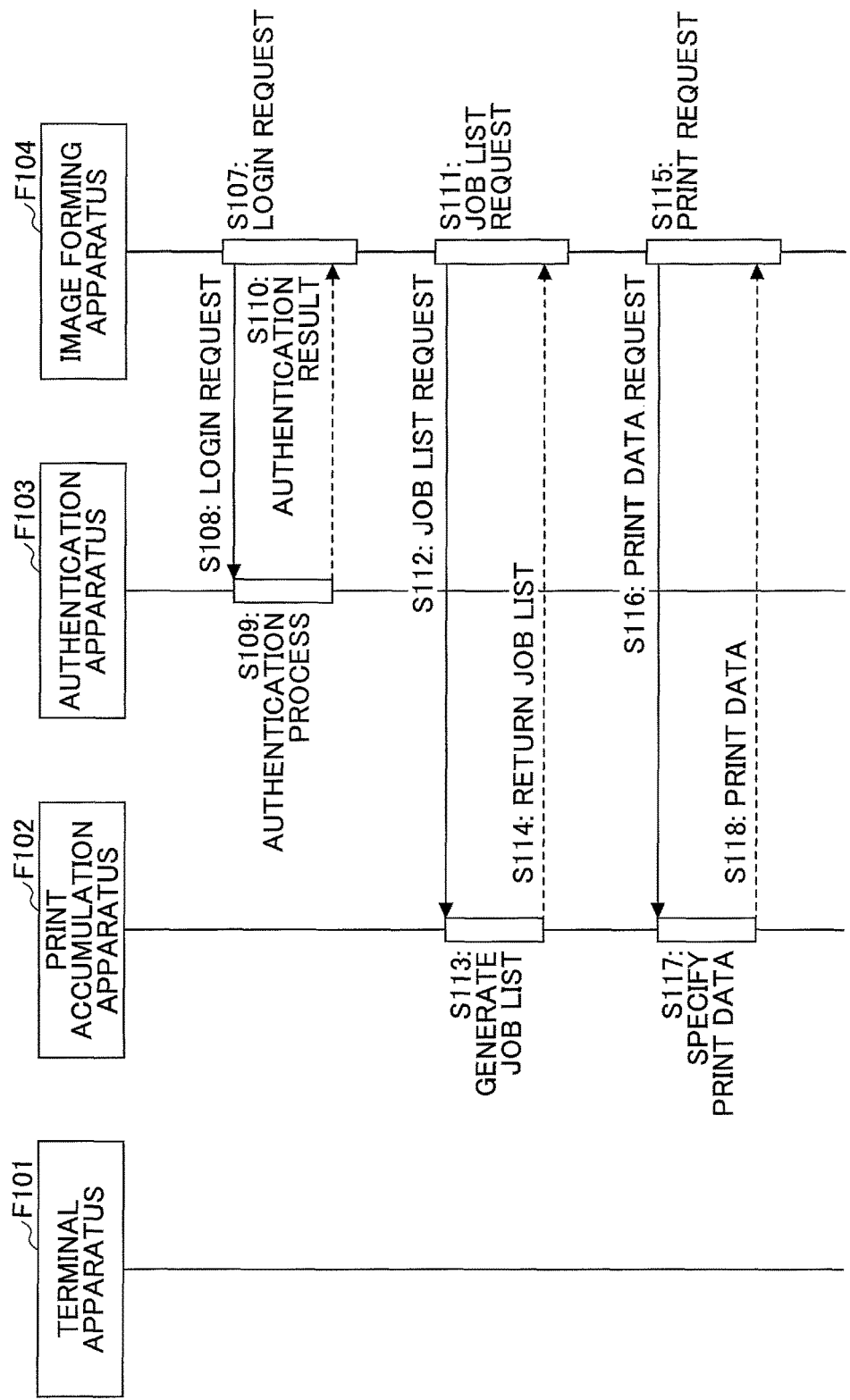
FIG. 7 is a sequence diagram illustrating print executing operations of the printing system illustrated in FIG. 1.

FIG. 7 is a sequence diagram illustrating print executing operations of the printing system illustrated in FIG. 1. Note that FIG. 7 assumes that the print accumulation apparatus F102 and authentication apparatus F103 operate normally.

In step S107, the user enables the image forming apparatus F104 to access the user's authentication recording medium F211 itself to indicate a login request. The authentication recording medium controller F210 acquires the user ID from the authentication recording medium (IC card) F211, and reports the acquired user ID to the authentication controller F208. In step S108, the authentication controller F208 transmits the reported user ID from the communications part F206 to indicate a login request.

In step S109, when the authentication apparatus F103 receives the login request, the authentication apparatus F103 performs an authentication process to verify whether the authentication apparatus internal user information of Table 4 or an external authentication service has registered the reported user ID. In step S110, the authentication apparatus F103 returns an authentication process result to the image forming apparatus F104. The authentication apparatus F103 also returns the authentication apparatus internal user information of the user ID that has succeeded the authentication to the image forming apparatus F104 as well as returning the authentication process result to the image forming apparatus F104. The image forming apparatus F104 generates image forming apparatus internal user authentication history information as illustrated in Table 5. The generated image forming apparatus internal user authentication history information is held by the authentication history holder F209.

When the login process has succeeded, the authentication controller F208 of the image forming apparatus F104 allows the login user to use the image forming apparatus F104. In step S111, the user operates the image forming apparatus F104 to transmit a job list acquisition request (job list request). In step S112, the authentication controller F208 of the image forming apparatus F104 transmits the user ID of the login user to the print accumulation apparatus F102 to transmit the job list request.

In step S113, the print accumulation apparatus F102 receives the job list request. The print information manager F236 of the print accumulation apparatus F102 detects the print job information including the received user ID from the print accumulation apparatus internal print job information of Table 2, and generates a job list from the detected print job information. In step S114, the print information manager F236 returns the generated job list to the image forming apparatus F104. The image forming apparatus F104 displays the job list.

In step S115, the user selects a print job from the job list displayed on the image forming apparatus F104 to transmit a print request. In step S116, the print controller F207 of the image forming apparatus F104 transmits a job ID indicating identification information of the print job to the print accumulation apparatus F102 via the communications part F206 to transmit a print data acquisition request (print data request).

In step S117, the print accumulation apparatus F102 reads the received job ID from the print accumulation apparatus internal print job information of Table 2, and specifies print data from the read print job information.

In step S118, the print accumulation apparatus F102 transmits the specified print data to the image forming apparatus F104. When the image forming apparatus F104 receives the print data, the print controller F207 performs printing of the print data.

Printing Flow when Print Accumulation Apparatus Malfunctions

Figure 8:
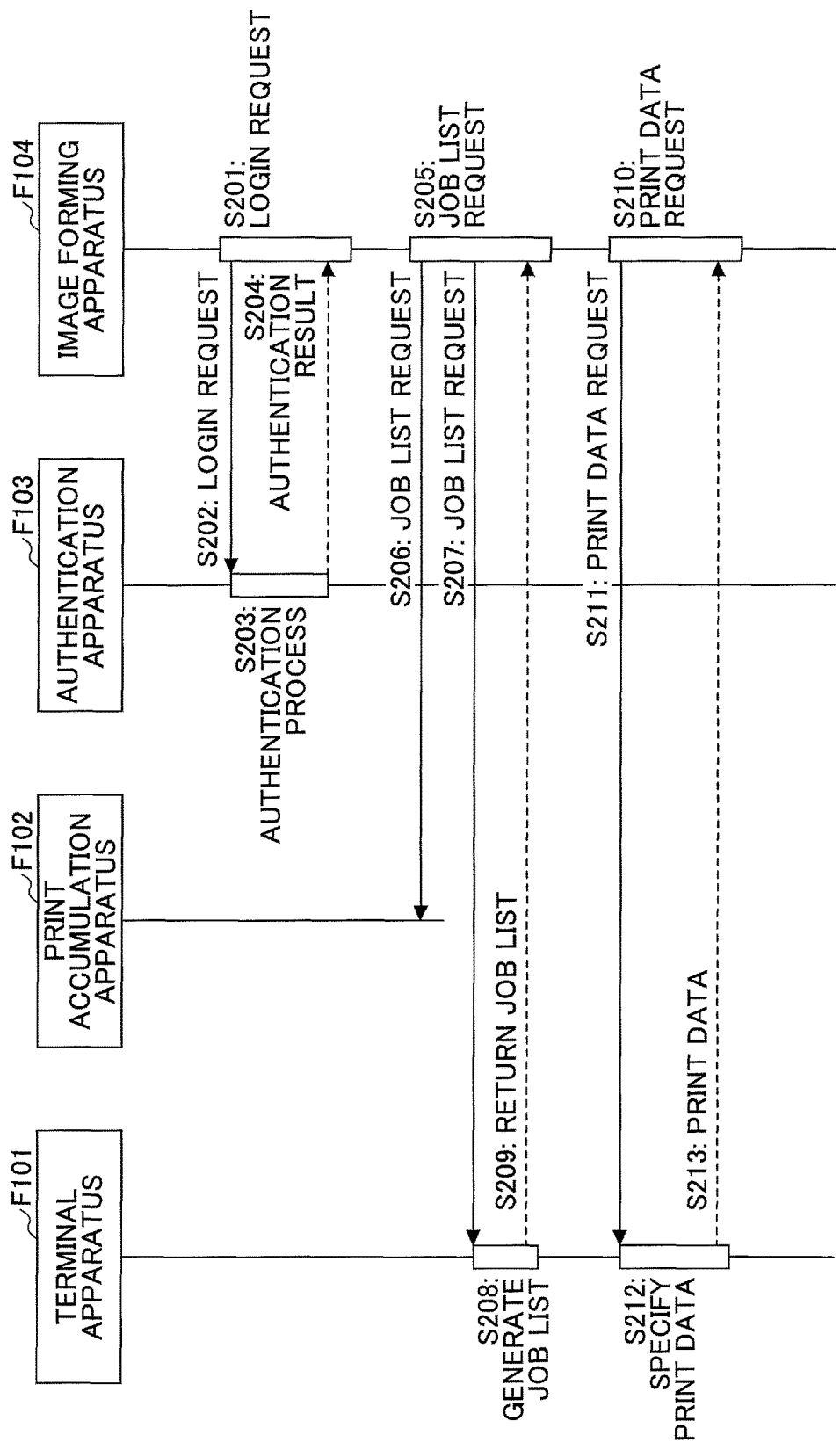
FIG. 8 is a sequence diagram illustrating print operations when the print accumulation apparatus of the printing system illustrated in FIG. 1 malfunctions.

FIG. 8 is a sequence diagram illustrating print operations when the print accumulation apparatus of the printing system illustrated in FIG. 1 malfunctions. Note that steps S201 to S205 in FIG. 8 are similar to steps S107 and S111 in FIG. 7, and a duplicated illustration is omitted from the specification. In step S206, the authentication controller F208 of the image forming apparatus F104 transmits the user ID of the login user to the print accumulation apparatus F102 to transmit a job list acquisition request (job list request).

Since failure has occurred in the print accumulation apparatus F102, and the print accumulation apparatus F102 malfunctions, the print accumulation apparatus F102 does not transmit a response to the image forming apparatus F104. When the authentication controller F208 of the image forming apparatus F104 awaits a response for a predetermined time, but does not receive a response from the print accumulation apparatus F102, the authentication controller F208 reads a record corresponding to the user ID from the image forming apparatus internal user authentication history information of Table 5 to acquire an encryption identifier of the terminal apparatus F101 from the read record.

The authentication controller F208 requests the authentication recording medium controller F210 to decrypt the encryption identifier of the terminal apparatus F101 read from the record corresponding to the user ID. The authentication recording medium controller F210 requests the authentication recording medium F211 to decrypt the encryption identifier of the terminal apparatus F101 read from the record corresponding to the user ID. The authentication recording medium F211 decrypts the encryption identifier of the terminal apparatus F101 with a secret key corresponding to the user ID to acquire an IP address of the terminal apparatus F101.

In step S207, the authentication controller F208 of the image forming apparatus F104 transmits the user ID of the login user to the terminal apparatus F101 to transmit a job list acquisition request (job list request).

In step S208, the terminal apparatus F101 receives the job list request. The print information manager F220 of the terminal apparatus F101 detects the print job information including the received user ID from the terminal apparatus internal print job information of Table 1, and generates a job list from the detected print job information. In step S209, the print instruction P101 returns the generated job list to the image forming apparatus F104. The image forming apparatus F104 displays the job list.

In step S210, the user selects a print job from the job list displayed on the image forming apparatus F104 to transmit a print data request. In step S211, the print controller F207 of the image forming apparatus F104 transmits a job ID indicating identification information of the print job to the terminal apparatus F101 via the communications part F206 to transmit a print data acquisition request (print data request).

In step S212, the terminal apparatus F101 reads the received job ID from the terminal apparatus internal print job information of Table 1, and specifies print data from the read print job information.

In step S213, the terminal apparatus F101 transmits the specified print data to the image forming apparatus F104. When the image forming apparatus F104 receives the print data, the print controller F207 performs printing of the print data.

As illustrated above, the printing system illustrated in FIG. 1 may enable the image forming apparatus F104 to perform printing by receiving the job list and the print data from the terminal apparatus F101 even when the print accumulation apparatus F102 malfunctions.

Figure 9:
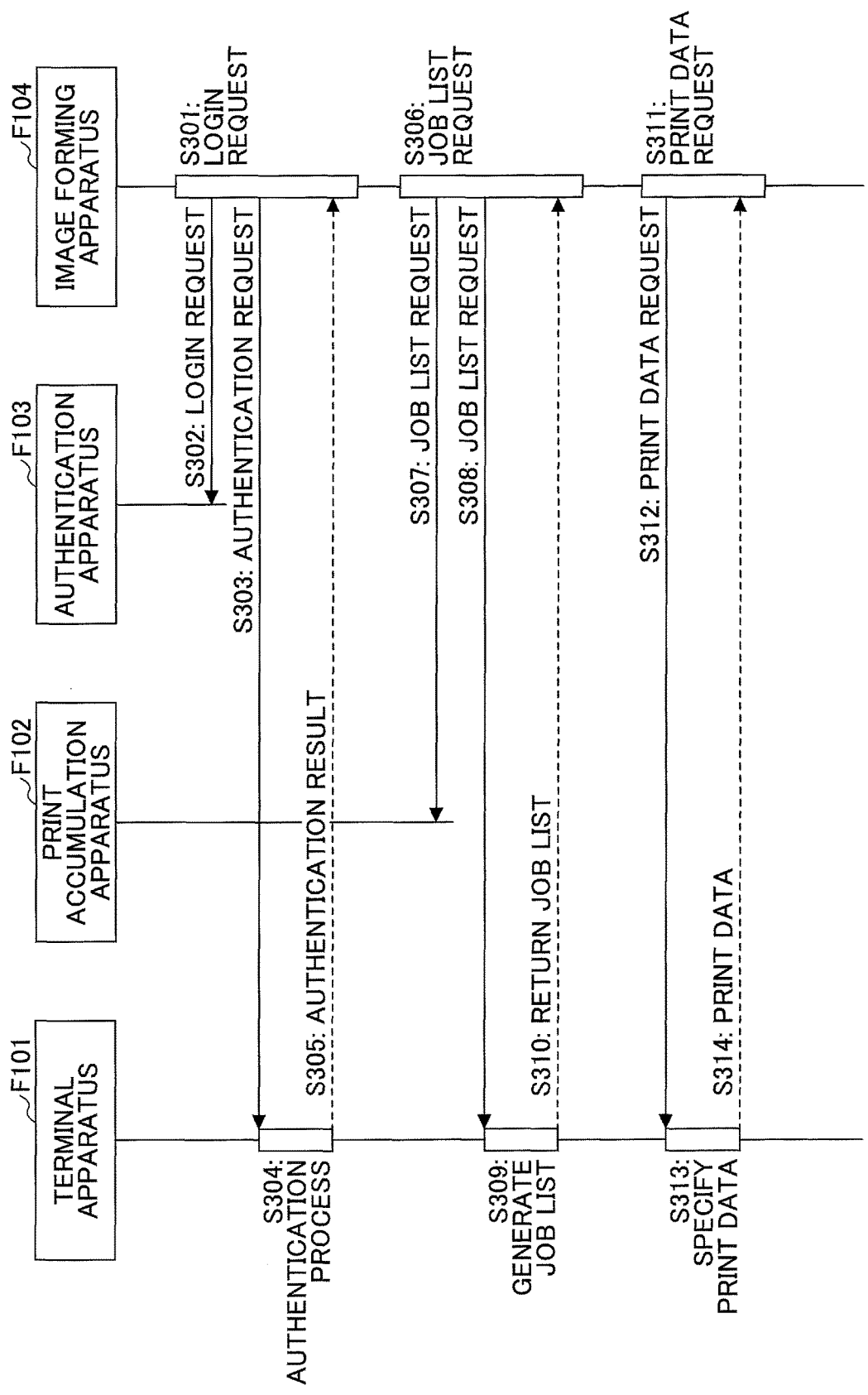
FIG. 9 is a sequence diagram illustrating print operations when the print accumulation apparatus and the authentication apparatus of the printing system illustrated in FIG. 1 malfunction.

Printing Flow when Both Print Accumulation Apparatus and Authentication Apparatus Malfunction FIG. 9 is a sequence diagram illustrating print operations when the print accumulation apparatus and the authentication apparatus of the printing system illustrated in FIG. 1 malfunction. Note that step S301 in FIG. 9 is similar to step S107 in FIG. 7, and a duplicated illustration is omitted from the specification. In step S302, the authentication controller F208 transmits the reported user ID from the communications part F206 to indicate a login request to the authentication apparatus F103.

Since failure has occurred in the authentication apparatus F103, and the authentication apparatus F103 malfunctions, the authentication apparatus F103 does not transmit a response to the image forming apparatus F104. When the authentication controller F208 of the image forming apparatus F104 awaits a response for a predetermined time, but does not receive a response from the authentication apparatus F103, the authentication controller F208 reads a record corresponding to the user ID from the image forming apparatus internal user authentication history information of Table 5 to acquire an encryption identifier of the terminal apparatus F101 from the read record.

The authentication controller F208 requests the authentication recording medium controller F210 to decrypt the encryption identifier of the terminal apparatus F101 read from the record corresponding to the user ID. The authentication recording medium controller F210 requests the authentication recording medium F211 to decrypt the encryption identifier of the terminal apparatus F101 read from the record corresponding to the user ID. The authentication recording medium F211 decrypts the encryption identifier of the terminal apparatus F101 with a secret key corresponding to the user ID to acquire an IP address of the terminal apparatus F101.

In step S303, the authentication controller F208 of the image forming apparatus F104 transmits the user ID of the login user to the terminal apparatus F101 to transmit an authentication request. In this step, the authentication controller F208 applies a signature to a character string having the user ID in association with authentication requested time and date, and transmits the signature applied to the character string simultaneously with transmission of the authentication request.

In step S304, the authentication part F230 of the terminal apparatus F101 receives the authentication request and the signature applied to the character string having the user ID in association with the authentication requested time and date. The authentication part F230 verifies whether the received a signature is correct based on a public key of the user registered in advance in the user information holder F205. The authentication part F230 also verifies whether the authentication requested time and date is within a specified time.

After the authentication part F230 verifies that the received a signature is correct and the authentication requested time and date is within the specified time, the authentication part F230 performs an authentication process to verify whether the terminal apparatus internal print job information of Table 1 has the reported user ID registered.

In step S305, the terminal apparatus F101 returns an authentication process result to the image forming apparatus F104 in the same as the authentication apparatus F103 returns the authentication process result to the image forming apparatus F104. The terminal apparatus F101 generates a shared key to be used after this authentication, encrypts the generated shared key with the public key of the user and returns the encrypted shared key to the image forming apparatus F104. Note that steps S301 and S305 will be described later.

When the login process has succeeded, the authentication controller F208 of the image forming apparatus F104 allows the login user to use the image forming apparatus F104. In step S306, the user operates the image forming apparatus F104 to transmit a job list acquisition request (job list request). In step S307, the authentication controller F208 of the image forming apparatus F104 transmits the user ID of the login user to the print accumulation apparatus F102 to transmit a job list acquisition request (job list request).

Since failure has occurred in the print accumulation apparatus F102, and the print accumulation apparatus F102 malfunctions, the print accumulation apparatus F102 does not transmit a response to the image forming apparatus F104. When the authentication controller F208 of the image forming apparatus F104 awaits a response for a predetermined time, but does not receive a response from the print accumulation apparatus F102, the authentication controller F208 transmits the user ID of the user by using the acquired IP address of the terminal apparatus F101 to transmit a job list request in a manner similar to the login requested time (step S308). In this step, the authentication controller F208 applies a signature to a character string having the user ID in association with authentication request time and date, and transmits the signature applied to the character string simultaneously with transmission of the authentication request.

In step S309, the authentication part F230 of the terminal apparatus F101 receives the job list request and the signature applied to the character string having the user ID in association with the authentication requested time and date. The authentication part F230 verifies whether the received a signature is correct based on a public key of the user registered in advance in the user information holder F205. The authentication part F230 also verifies whether the authentication requested time and date is within a specified time.

After verifying that the received a signature is correct and the authentication requested time and date is within the specified time, the print information manager F220 of the terminal apparatus F101 detects the print job information including the received user ID from the terminal apparatus internal print job information of Table 1, and generates a job list from the detected print job information. In step S310, the print controller F202 encrypts the generated job list with a shared key, and returns the encrypted job list to the image forming apparatus F104. The image forming apparatus F104 decrypts the encrypted job list with the shared key and displays the job list.

In step S311, the user selects a print job from the job list displayed on the image forming apparatus F104 to transmit a print data request. In step S312, the print controller F207 of the image forming apparatus F104 encrypts a job ID indicating identification information of the print job with a shared key and transmits the encrypted job ID to the terminal apparatus F101 via the communications part F206 to transmit a print data acquisition request (print data request).

In step S313, the terminal apparatus F101 decrypts the encrypted job ID with the shared key, and reads the print job information corresponding to the decrypted job ID from the terminal apparatus internal print job information of Table 1. The terminal apparatus F101 specifies a storage location of the original data or the print data from a path column of the print job information, and verifies whether the original data or the print data are stored in the specified storage location.

When the print data are stored in the specified storage location, the terminal apparatus F101 encrypts the print data stored in the specified storage location with the shared key. In step S314, the terminal apparatus F101 transmits the encrypted print data to the image forming apparatus F104.

When the original data are stored in the specified storage location, the terminal apparatus F101 generates print data from the original data stored in the specified storage location based on the document information of the print job information. The terminal apparatus F101 encrypts the generated print data with the shared key. In step S314, the terminal apparatus F101 transmits the encrypted print data to the image forming apparatus F104. The image forming apparatus F104 that has received the encrypted print data decrypts the encrypted print data with the shared key to execute printing.

The printing system illustrated in FIG. 1 may thus enable the terminal apparatus F101 to perform an authentication process even if the print accumulation apparatus F102 and the authentication apparatus F103 both malfunction. The printing system illustrated in FIG. 1 may enable the image forming apparatus F104 to receive the job list and the print data from the terminal apparatus F101 to perform printing.

The sequence diagram of FIG. 9 may also assumes a case where the original data do not exist at the storage location that has been specified from the path column of the read print job information. Such a case appears to result from the original data being deleted or moved by the user. The printing system illustrated in FIG. 1 may fail to cause the image forming apparatus F104 to perform printing when the original data do not exist at the storage location.

Print Job Accumulation Process

Figure 10:
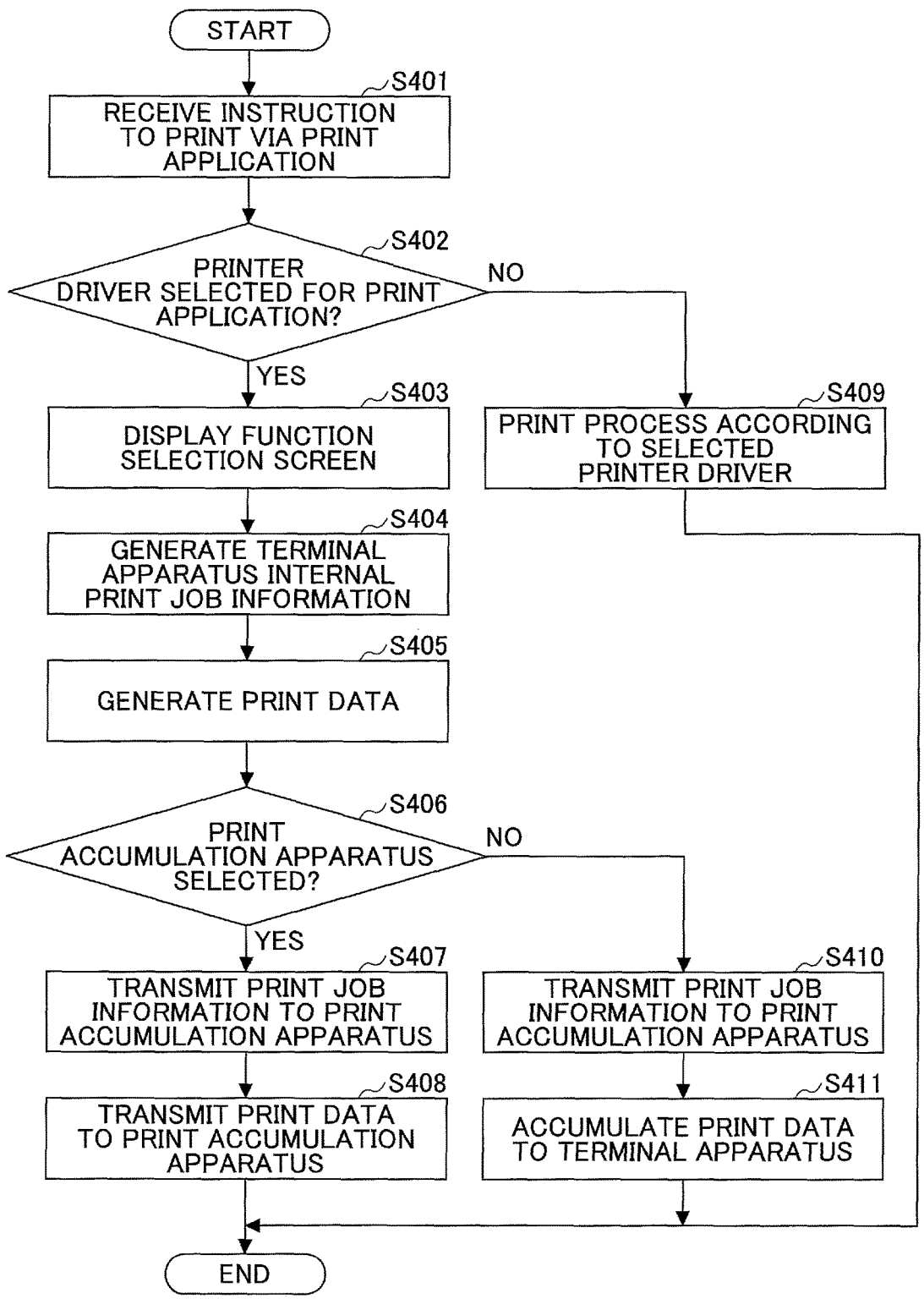
FIG. 10 is a flowchart illustrating an example of a print job accumulation process.
Figure 11:
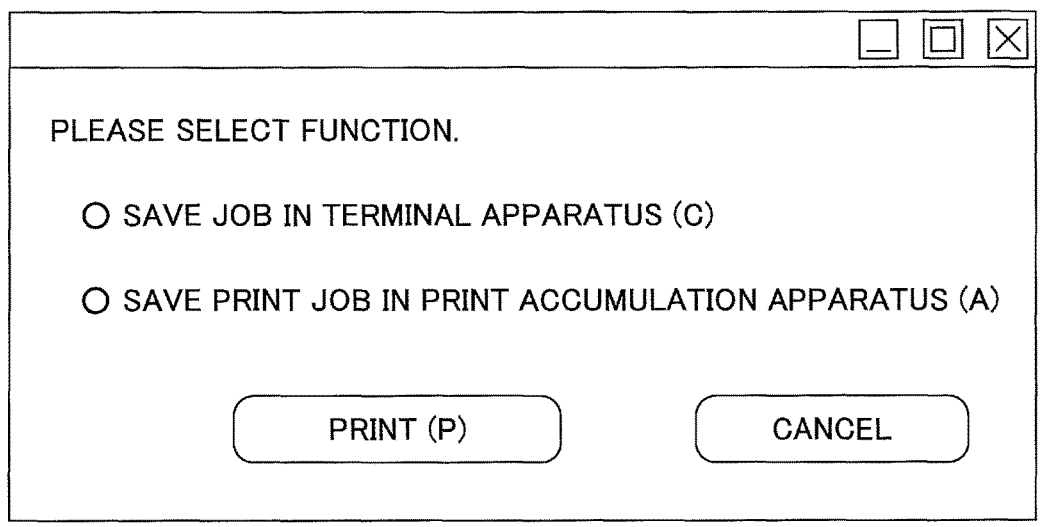
FIG. 11 is an image diagram illustrating an example of a function selection screen.

FIG. 10 is a flowchart illustrating an example of a print job accumulation process. FIG. 11 illustrates an example of a function selection screen displayed in the terminal apparatus illustrated in FIG. 1.

The user may start a print job accumulation process by selecting one of "save job in terminal apparatus" and "save print job in print accumulation apparatus" illustrated in FIG. 11, and then clicks a "PRINT" button. Note that when the user may simply click a "CANCEL" button to cancel the print job accumulation process.

In step S401, an application program for generating data subject to printing receives a print instruction from a user and displays a print setting screen. In step S402, an application program receives a printer driver selected in printer selection of the print setting screen from the user.

When the user selects a printer driver other than the printer driver to specify a certain print application by a program according to an embodiment, the terminal apparatus F101 performs a printing process according to the printer driver selected by the user, and ends the process of the flowchart of FIG. 10 in step S409.

When the user selects the printer driver to specify a certain print application by a program according to an embodiment, the terminal apparatus F101 displays the function selection screen illustrated in FIG. 11. In step S404, the print application generates terminal apparatus internal print job information and causes the print information holder F221 to the generated terminal apparatus internal print job information.

In step S405, the print application generates print data. In step S406, the print application determines which of the terminal apparatus F101 and the print accumulation apparatus F102 is selected as an accumulation destination based on the user's selection in the function selection screen.

When the print accumulation apparatus F102 is selected as an accumulation destination, the print application transmits to the print accumulation apparatus F102 print job information for registering print accumulation apparatus internal print job information in the print accumulation apparatus F102 in step S407. Specifically, the print application transmits the user ID and the job name. The print application also registers terminal apparatus internal print job information. The print application transmits the print data to the print accumulation apparatus F102 in step S408, and subsequently ends the flowchart illustrated in FIG. 10.

When the terminal apparatus F101 is selected as the accumulation destination, the print application transmits to the print accumulation apparatus F102 print job information for registering print accumulation apparatus internal print job information in the print accumulation apparatus F102 in step S410. More specifically, the print application transmits the user ID, the job name, and an encryption identifier of the terminal apparatus F101 to the print accumulation apparatus F102. The print application also registers terminal apparatus internal print job information. The print application accumulates the print data in the print accumulator F203 of the terminal apparatus F101 in step S411, and subsequently ends the flowchart illustrated in FIG. 10.

Login Process

Figure 12:
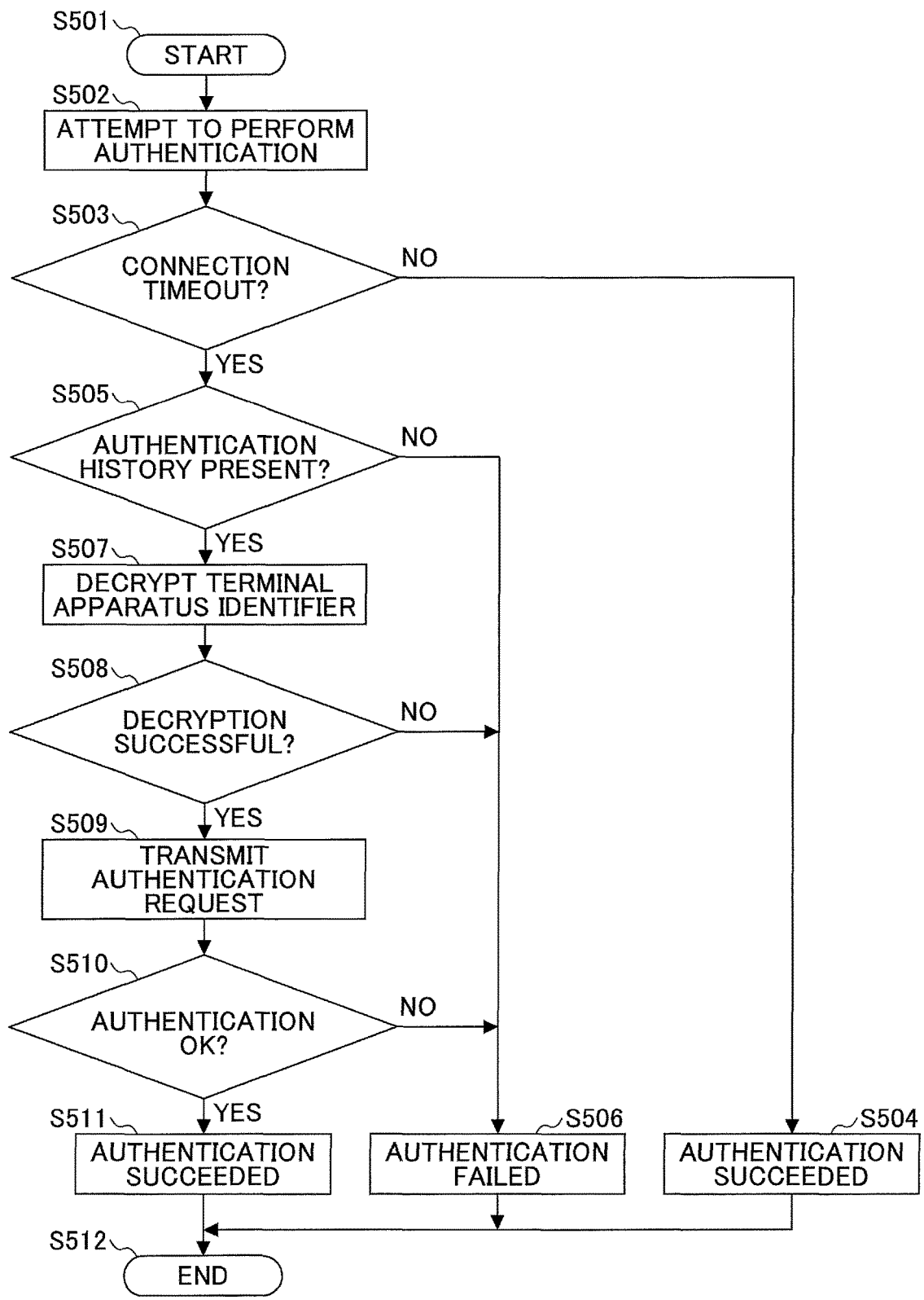
FIG. 12 is a diagram illustrating an example of a flowchart of a login process in the printing system illustrated in FIG. 1.
Figure 13:
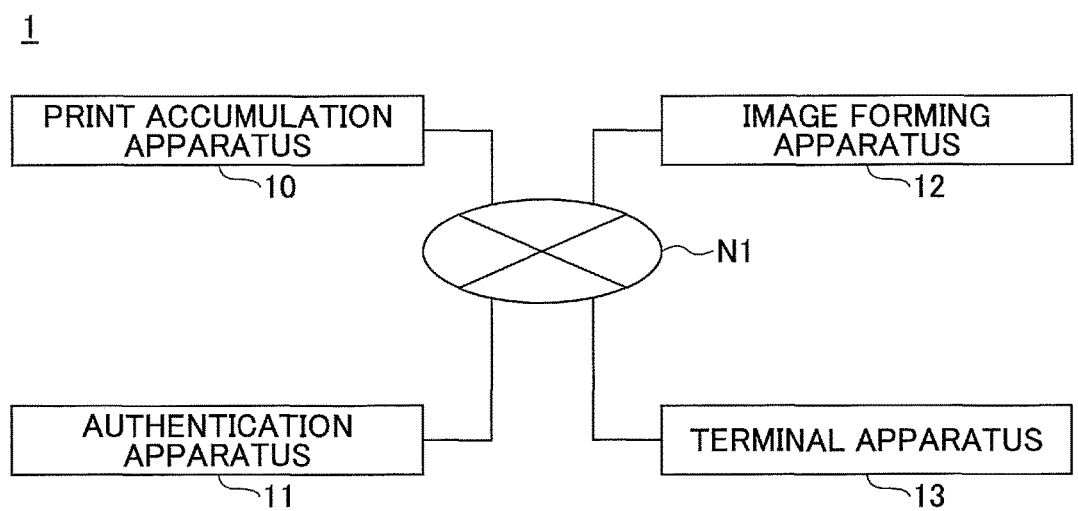
FIG. 13 is a configuration diagram illustrating an example of a printing system according to a second embodiment.

FIG. 12 is a diagram illustrating an example of a flowchart of a login process in the printing system illustrated in FIG. 13.

In step S501, the user enables the image forming apparatus F104 to access the user's authentication recording medium F211 itself to indicate a login request. In step S502, the authentication recording medium controller F210 acquires the user ID from the authentication recording medium F211, and reports the acquired user ID to the authentication controller F208. The authentication controller F208 transmits the reported user ID from the communications part F206 to indicate a login request to the authentication apparatus F103 (corresponding to step S202).

In step S503, the image forming apparatus F104 determines whether the connection has timed out indicating awaiting a response for a predetermined time but not receiving a response (whether the terminal apparatus F101 returns an authentication response). When the image forming apparatus F104 receives the authentication response, the image forming apparatus F104 determines that the authentication has succeeded in step S504, and ends the process. The authentication having succeeded in the above indicates whether the authentication has been successfully performed but does not indicate the authentication result.

When the connection has timed out indicating awaiting a response for a predetermined time but not receiving a response, the authentication controller F208 determines whether the authentication history holder F209 holds an authentication history of the corresponding user in step S505. When the authentication history holder F209 does not hold an authentication history of the corresponding user, the image forming apparatus F104 determines that the authentication has failed (step S506), and ends the process.

When the authentication history holder F209 holds an authentication history of the corresponding user, the authentication controller F208 decrypts the encryption identifier of the terminal apparatus F101 included in the authentication history using a decryption function provided by the authentication recording medium F211 through the authentication recording medium controller F210 in step S507.

In step S508, when the authentication controller F208 fails to decrypt the encryption identifier of the terminal apparatus F101 to obtain the IP address, the authentication controller F208 also fails to identify the terminal apparatus F101 as a connection destination. Thus, the image forming apparatus F104 determines that the authentication has failed, and ends the process (step S506).

When the authentication controller F208 successfully decrypts the encryption identifier of the terminal apparatus F101 to obtain the IP address in step S508, the authentication controller F208 transmits an authentication request to the terminal apparatus F101 using the IP address of the terminal apparatus F101 obtained as a result of the decryption in step S509. In this step, the authentication controller F208 applies a signature to a character string having the user ID in association with authentication request time and date, and transmits the signature applied to the character string simultaneously with transmission of the authentication request.

In step S510, the authentication part F204 that has received the character string having the user ID in association with authentication request time and date together with the authentication request verifies whether the received a signature is correct based on a corresponding public key registered in advance in the user information holder F205. The authentication part F204 also verifies whether the authentication requested time and date is within a specified time.

When the verification fails, the authentication part F204 transmits that the authentication has failed to the authentication controller F208 in step S506. The authentication controller F208 that has received the authentication failed result ends the process as authentication failure. When the verification is successful (step S511), the authentication part F204 transmits the user information (saved in step S101) such as authorization information held by the user information holder F205 with a format the same as the information transmitted from the authentication apparatus F103 to the image forming apparatus F104. Simultaneously, the terminal apparatus F101 generates a shared key for use in steps subsequently to the authentication step, and transmits the shared key encrypted with a public key corresponding to the secret key within the authentication recording medium F211.

The authentication controller F208 of the image forming apparatus F104 temporarily holds the user information such as authorization information and the shared key internally, and ends the process as successful authentication.
Program The printing system according to the above-described embodiment may be implemented by programs that cause a computer to execute processes. Examples of the computer include general-purpose computers such as a personal computer or a workstation. However, the computer applied is not limited to the general-purpose computers. The programs may also be stored in a computer-readable recording medium.
Recording Medium Examples of the recording medium include computer-readable recording medium such as a CR-ROM, a flexible disk (FD) and a CD-R, semiconductor memory such as a flash memory, RAM, ROM and FeRAM, or a HDD.

The CD-ROM is an abbreviation of a compact disc read only memory. The flexible disk indicates "Flexible Disk: FD". The CD-R indicates "CD recordable". The FeRAM is abbreviation of ferroelectric RAM, indicating ferroelectric memory.
Effect The printing system according to the above-described embodiment may implement secure pull printing using authentication even if one of the communications part F201 and the authentication apparatus F103 has failed.

Note that the above-described embodiment represents only one of the preferred embodiments, and the invention is thus not limited to the disclosed embodiment. Various alteration and modification may be made without departing from the scope of the invention.
Second Embodiment The following illustrates a printing system according to a second embodiment as another aspect of the output system.
System Configuration FIG. 13 is a configuration diagram illustrating an example of a printing system according to the second embodiment. The printing system according to the second embodiment includes a print accumulation apparatus 10, an authentication apparatus 11, an image forming apparatus 12, and a terminal apparatus 13 that are connected via network N1 such as a LAN. The print accumulation apparatus 10, the authentication apparatus 11, the image forming apparatus 12, and the terminal apparatus 13 include respective wired or wireless communications units. Note that FIG. 13 illustrates an example of the printing system that includes the print accumulation apparatus 10, the authentication apparatus 11, the image forming apparatus 12, and terminal apparatus 13 the number of each of which is one; however, the number of each of which may be two or more. The print accumulation apparatus 10 and the authentication apparatus 11 may be implemented by one or more information processing apparatuses.

The printing system illustrated in FIG. 13 allows a user to assign a print job accumulation process instruction via the terminal apparatus 13. The printing system may perform the print job accumulation process to allow the print accumulation apparatus 10 and the terminal apparatus 13 to hold the print job information. The printing system may perform the print job accumulation process to allow the print accumulation apparatus 10 and the terminal apparatus 13 to hold print data.

The user assigns a print job output process instruction via the image forming apparatus 12. When the print accumulation apparatus 10 and the print accumulation apparatus 10 operate normally, the image forming apparatus 12 acquires the print job information from the print accumulation apparatus 10 by executing the print job output process in the printing system 1. The image forming apparatus 12 determines a storage location of the print data from the acquired print job information (the print accumulation apparatus 10 or the terminal apparatus 13), acquires the print data from the storage location of the print data, and executes printing.

When the print accumulation apparatus 10 malfunctions, the image forming apparatus 12 acquires print job information and print data from the terminal apparatus 13 by executing the print job output process in the printing system 1. When the authentication apparatus 11 malfunctions in the printing system 1, the terminal apparatus 13 is caused to perform the authentication process.

Figure 14:
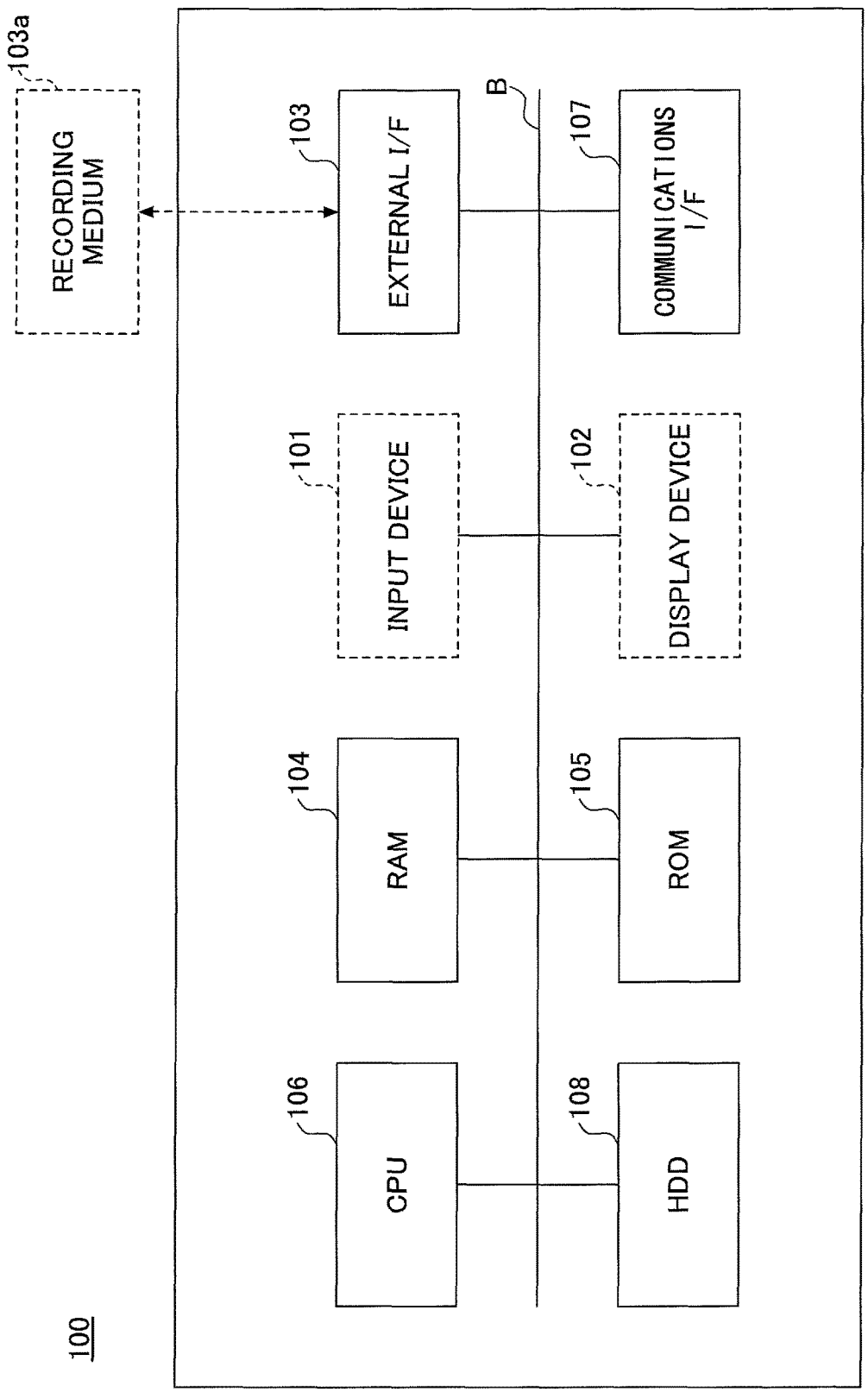
FIG. 14 is a hardware configuration diagram illustrating an example of a computer according to the second embodiment.

The authentication apparatus 11 is caused to hold user information and the like and perform authentication based on a request from the print accumulation apparatus 10 or the image forming apparatus 12. The image forming apparatus 12 may be a printing apparatus such as a printer, a copier, a multifunction peripheral, or a laser printer, a projection apparatus or a display apparatus configured to execute a display output such as a projector or a monitor, or an sound-voice output apparatus configured to output audio data such as audio. Note that a configuration of the printing system 1 illustrated in FIG. 13 is an example, and the printing system 1 may have other configurations.
Hardware Configuration The print accumulation apparatus 10, the authentication apparatus 11, and the terminal apparatus 13 illustrated in FIG. 13 may be implemented by a computer having a hardware configuration illustrated in FIG. 14. FIG. 14 is a hardware configuration diagram illustrating an example of the computer according to the second embodiment.

The computer 100 illustrated in FIG. 14 includes an input device 101, a display device 102, an external I/F 103, a RAM 104, a ROM 105, a CPU 106, a communications I/F 107, an HDD 108, and the like that are connected to one another via a bus B. Note that the input device 101 and the display device 102 may optionally be connected to the computer 100 as required.

The input device 101 includes a keyboard, a mouse, and the like, and is configured to allow a user to input various operation signals. The display device 102 includes a display, and the like, and is configured to display results of processes performed by the computer 100.

The communications I/F 107 serves as an interface configured to connect the computer 100 to the network N1. This configuration enables the computer 100 to perform data communications via the communications I/F 107.

The HDD 108 serves as a nonvolatile storage configured to store programs and data. Example of the stored programs and data include an OS serving as basic software that is configured to control overall operations of the computer 100, application software that is configured to provide various types of functions on the OS, and the like.

The external I/F 103 serves as an interface with respect to external devices. Examples of the external devices include a recording medium 103a, and the like. Having the external I/F 103 enables the computer 100 to read information from the recording medium 103a or write information on the recording medium 103a via the external I/F 103. Examples of the recording medium 103a include a flexible disk, a CD, a DVD, a SD memory card, and a USB memory.

The ROM 105 is a nonvolatile semiconductor memory (a storage device) configured to retain programs or data even when the power supply is turned off. The ROM 105 is configured to store programs and data such as BIOS, OS settings, network settings, and the like that are executed at startup of the computer 100. The RAM 104 is a volatile semiconductor memory configured to temporarily store programs and data.

The CPU 106 is a processor configured to implement control of overall operations or functions of the computer 100 by loading programs and data in the RAM 104 from a storage device such as the ROM 105 and the HDD 108 to execute processes in accordance with the loaded programs and data.

The print accumulation apparatus 10, the authentication apparatus 11, and the terminal apparatus 13 according to the second embodiment may be able to implement various types of processes described later by having the above-described hardware configuration of the computer 100.

Figure 15:
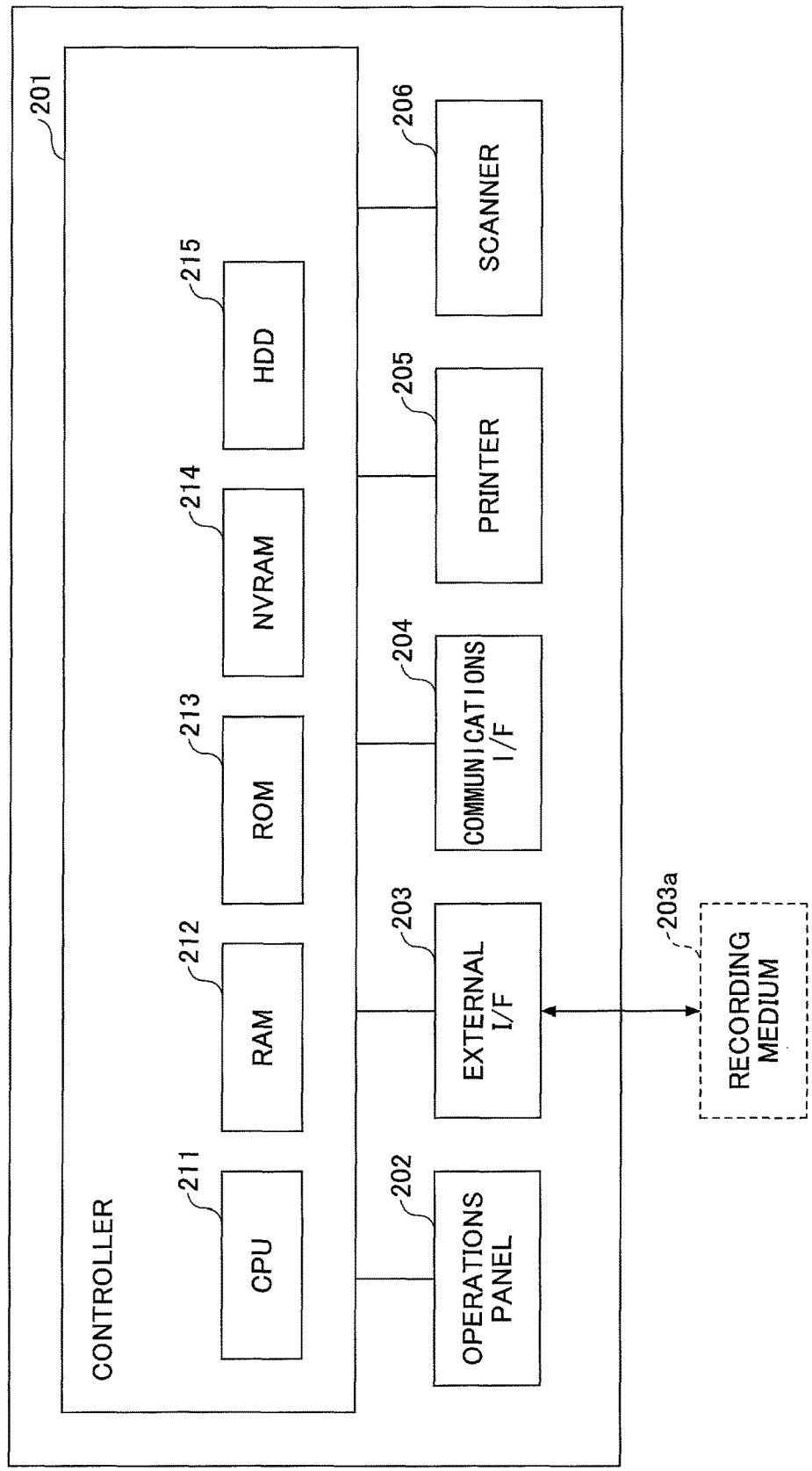
FIG. 15 is a hardware configuration diagram illustrating an example of an image forming apparatus according to the second embodiment.

The image forming apparatus 12 illustrated in FIG. 13 may be implemented by a computer having a hardware configuration illustrated in FIG. 15, for example. FIG. 15 is a hardware configuration diagram illustrating an example of the image forming apparatus 12 according to the second embodiment. The image forming apparatus 12 illustrated in FIG. 15 includes a controller 201, an operations panel 202, an external I/F 203, a communications I/F 204, a printer 205, and a scanner 206.

The controller 201 includes a CPU 211, a RAM 212, a ROM 213, a NVRAM 214, and an HDD 215. The ROM 213 is configured to store various types of programs and data. The RAM 212 is configured to temporarily hold programs and data. The NVRAM 214 may, for example, store setting information and the like. The HDD 215 is configured to store various types of programs and data.

The CPU 211 is configured to implement overall control of operations or functions of the image forming apparatus 12 by loading programs, data, and setting information in the RAM 212 from a storage device such as the ROM 213, the NVRAM 214, and the HDD 215 to execute processes in accordance with the loaded programs, data, and setting information.

The operations panel 202 includes an input part configured to receive input from the user, and a display part configured to perform display. The external I/F 203 servers as an interface with respect to external devices. Examples of the external devices include a recording medium 203a, and the like. Having the external I/F 203 enables the image forming apparatus 12 to read information from the recording medium 203a or write information on the recording medium 203a via the external I/F 203. Examples of the recording medium 203a include a flexible disk, a CD, a DVD, an SD memory card, and a USB memory.

The communications I/F 204 serves as an interface configured to connect the image forming apparatus 12 to the network N1. This configuration enables the image forming apparatus 12 to perform data communications via the communications I/F 204. The printer 205 is a printing apparatus configured to print the print data on sheets of paper. The scanner 206 is a reading apparatus configured to read image data (electronic data) from a document.

Software Configuration

Terminal Apparatus

Figure 16:
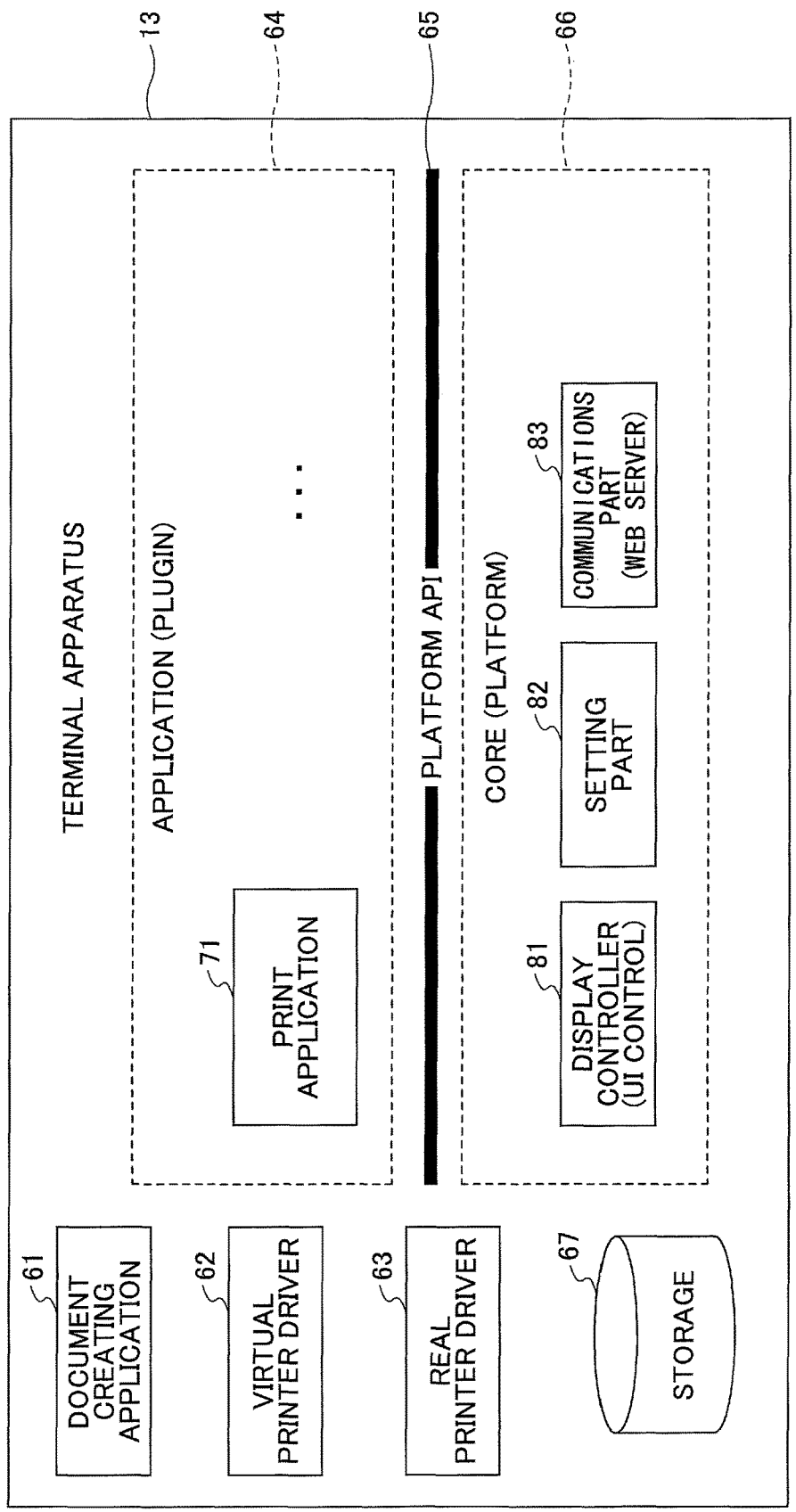
FIG. 16 is a process block diagram illustrating an example of a terminal apparatus according to the second embodiment.

The image forming apparatus 13 according to the second embodiment may be implemented, for example, by process blocks illustrated in FIG. 16. FIG. 16 is a process block diagram illustrating an example of the terminal apparatus 13 according to the second embodiment.

The terminal apparatus 13 is configured to implement a document creating application 61, a virtual printer driver 62, a real printer driver 63, a plugin 64, a platform API 65, a platform 66, and a storage 67 by executing programs. The plugin 64 includes a print application 71. The platform 66 includes a display controller (UI controller) 81, a setting part 82, and a communications part 83.

The document creating application 61 is an example of an application configured to receive a print request from a user. The document creating application 61 is only an example, and may be an application configured to receive an output request such as a print request from the user.

The virtual printer driver 62 is an example of a printer driver configured to allow the user to specify the print application 71. The real printer driver 63 is an example of a printer driver configured to convert application data into print data in a form that may be printed by the image forming apparatus 12. The application data are an example of data (original file) subject to printing.

The plugin 64 is software operating on the platform 66. The plugin 64 may access a function of the platform 66 by utilizing the platform API 65. The print application 71 of the plugin 64 may serve as the print controller F202, the authentication part F204, and the print information manager F220 illustrated in FIG. 3.

The platform API 65 is an interface prepared for the plugin 64 to access a function of the platform 66. The platform API 65 is a predefined interface provided for allowing the platform 66 to receive a request from the plugin 64. The platform API 65 may, for example, be composed of functions or classes.

The display controller 81 of the platform 66 may be configured to control display of the display device 102 based, for example, on a request from the document creating application 61, or the plugin 64. The setting part 82 is configured to set the plugin 64. The communications part 83 is configured to perform communications with the print accumulation apparatus 10, the authentication apparatus 11, the image forming apparatus 12, and the like. The storage part 67 is configured to store settings and the like.

The terminal apparatus 13 integrates functions commonly used by the plugin 64 so as to integrate processes. Note that classification of components in the process block diagram in FIG. 16 is merely an example. It is not mandatory to hierarchically classify the components as illustrated in FIG. 16.

Note that the process blocks of the print accumulation apparatus 10, the authentication apparatus 11, and the image forming apparatus 12 are similar to those of the print accumulation apparatus F102, the authentication apparatus F103, and the image forming apparatus F104 illustrated in FIG. 3 or FIG. 4, a duplicated illustration is omitted from the specification.

Details of Process

The following illustrates details of a process of the printing system 1 according to the second embodiment.

Print Job Accumulation Process

A user may, for example, operate the document creating application 61 to display a print setting screen, and select a virtual printer driver 62 from the print setting screen to give a print instruction, thereby starting a print job accumulation process.

Figure 17:
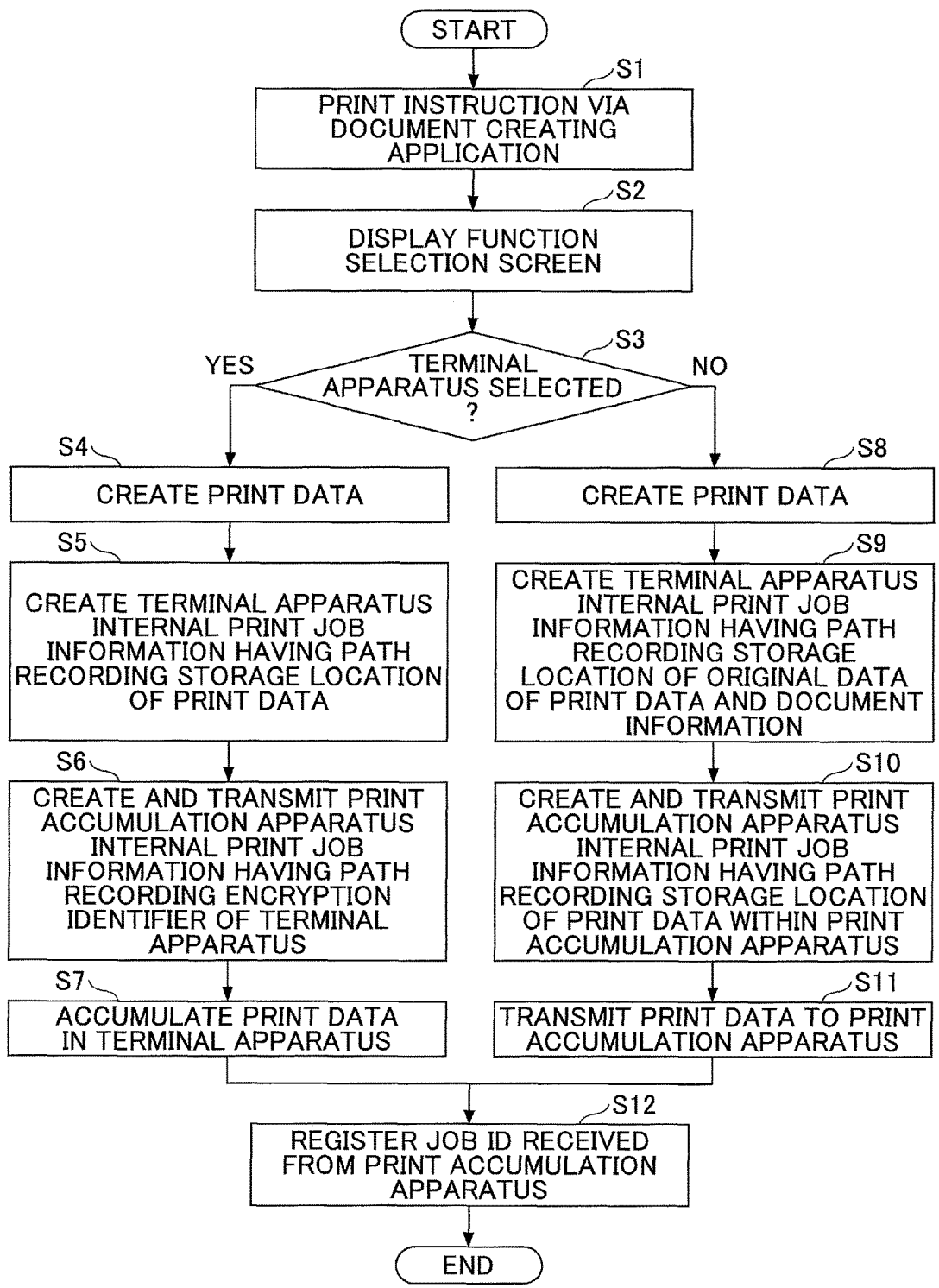
FIG. 17 is a flowchart illustrating an example of a print job accumulation process.

When the user selects the virtual printer driver 62 to request printing, the terminal apparatus 13 starts the print job accumulation process illustrated in FIG. 17. FIG. 17 is a flowchart illustrating an example of the print job accumulation process.

In step S1, the document creating application 61 transmits a print event to the virtual printer driver 62. The virtual printer driver 62 transmits the print event to the print application 71. The print application 71 displays a function selection screen illustrated in FIG. 11 on the display controller 81 based on the print event received from the 62 in step S2.

The user may select one of "save job in terminal apparatus" and "save print job in print accumulation apparatus" displayed on the function selection screen to determine an accumulation destination for the print data. The user may be able to select one of the print accumulation apparatus 10 and the terminal apparatus 13 from the function selection screen illustrated in FIG. 11, as the accumulation destination for the print data.

When the user selects the terminal apparatus 13 as the accumulation destination ("YES" in step S3), the print application 71 utilizes the real printer driver 63 to create print data from the application data in step S4.

In the following illustration, it is assumed that the "terminal apparatus 13" is selected from the function selection screen as the accumulation destination for the print data. In step S5, the print application 71 creates a terminal apparatus internal print job having a path recording a storage location of the print data demonstrated as the print job information of the job ID "PJ102" illustrated in Table 1.

In step S6, the print application 71 creates print accumulation apparatus internal print job information having a path recording an encryption identifier of the terminal apparatus 13 demonstrated as the print job information of the job ID "PJ102" illustrated in Table 2, and transmits the created print accumulation apparatus internal print job information to the print accumulation apparatus 10. The encryption identifier of the terminal apparatus 13 is identification information identifying the terminal apparatus 13 (e.g. IP address), which is encrypted with a public key associated with the user ID.

In step S7, the print application 71 accumulates the generated print data in a storage 67 within the terminal apparatus 13. In step S12, the print application 71 subsequently registers the job ID received from the print accumulation apparatus 10 in the terminal apparatus internal print job created in step S5.

On the other hand, when the user selects the print accumulation apparatus 10 as the accumulation destination ("NO" in step S3), the print application 71 utilizes the real printer driver 63 to create print data from the application data in step S8.

In the following illustration, it is assumed that the "print accumulation apparatus 10" is selected from the function selection screen as the accumulation destination for the print data. In step S9, the print application 71 creates terminal apparatus internal print job having a path recording a storage location of original data of the print data as well as recording document information demonstrated as the print job information of the job ID "PJ100" or "PJ101" illustrated in Table 1.

In step S10, the print application 71 creates print accumulation apparatus internal print job information having a path recording a storage location of the print data demonstrated as the print job information of the job ID "PJ100" or "PJ101" illustrated in Table 2, and transmits the created print accumulation apparatus internal print job information to the print accumulation apparatus 10. Note that the paths of the print job information of the job IDs "PJ100" and "PJ101" illustrated in Table 2 represent respective storage locations of the print data accumulated in the print information holder F237 or the like of the print accumulation apparatus 10.

In step S11, the print application 71 transmits the print data generated in step S8 to the print accumulation apparatus 10. The print accumulation apparatus 10 accumulates the received print data at the storage location indicated by the path of the print job information illustrated in Table 2. In step S12, the print application 71 subsequently registers the job ID received from the print accumulation apparatus 10 in the terminal apparatus internal print job created in step S9.

Login Process

Figure 18:
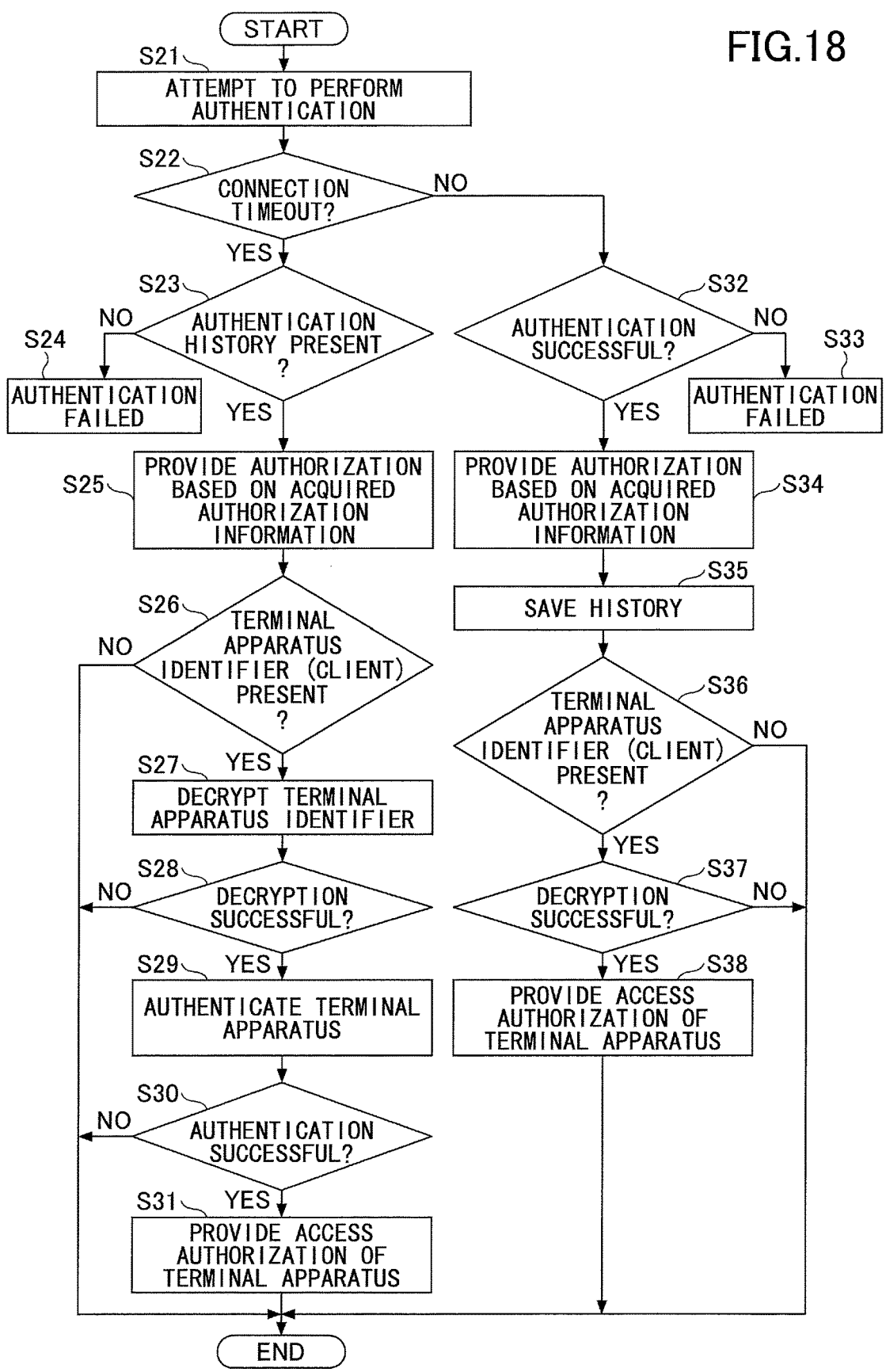
FIG. 18 is a diagram illustrating an example of a flowchart of a login process in the printing system illustrated in FIG. 13.

FIG. 18 is a diagram illustrating an example of a flowchart of a login process in the printing system illustrated in FIG. 13. The user enables the image forming apparatus 12 to access the user's authentication recording medium F211 itself to indicate a login request. Note that the user may input the user ID via the operations panel 202 of the image forming apparatus 12.

In step S21, the image forming apparatus 12 acquires the user ID from the authentication recording medium F211, and transmits the acquired user ID to the authentication apparatus 11, thereby indicating the login request to the authentication apparatus 11. In step S22, the image forming apparatus 12 determines whether the connection has timed out indicating awaiting a response for a predetermined time but not receiving a response.

When the connection has timed out indicating awaiting a response for a predetermined time but not receiving a response, the image forming apparatus 12 determines whether the authentication history holder F209 holds authentication history information of the corresponding user in step S23. When the authentication history holder F209 does not hold the authentication history information of the corresponding user, the image forming apparatus 12 determines that the authentication has failed in step S24, and ends the process.

When the authentication history holder F209 holds the authentication history information of the corresponding user, the image forming apparatus 12 acquires the authentication history information of the corresponding user illustrated in Table 5 in step S25. The image forming apparatus 12 subsequently provides the user with authorization such as copying authorization or printing authorization based on the authentication history information of the corresponding user.

In step S26, the image forming apparatus 12 determines whether the authentication history information of the corresponding user holds an encryption identifier of the terminal apparatus 13. When the authentication history information of the corresponding user holds the encryption identifier of the terminal apparatus 13, the image forming apparatus 12 decrypts the encryption identifier of the terminal apparatus 13 with a secret key of the corresponding user in step S27.

When the image forming apparatus 12 successfully decrypts the encryption identifier of the terminal apparatus 131 to obtain an IP address in step S28, the image forming apparatus 12 transmits an authentication request to the terminal apparatus 13 using the IP address of the terminal apparatus 13 obtained as a result of the decryption in step S29. Note that the image forming apparatus 12 applies a signature to the user ID and transmits the signature applied to the user ID simultaneously with transmission of the authentication request to the terminal apparatus 13.

In step S30, the terminal apparatus 13 that has received the authentication request and the signature applied user ID verifies whether the signature applied is correct based on the public key of the corresponding user registered in advance in the user information holder F205. When the terminal apparatus 13 determines that the signature is correct and the signature applied user ID corresponds to the user who operates the terminal apparatus 13, the terminal apparatus 13 returns an authentication success report to the image forming apparatus 12.

In step S31, the image forming apparatus 12 provides the user with access authorization to access the terminal apparatus 13. In this case, the user is provided with authorization to access the functions of the image forming apparatus 12 and authorization to access the terminal apparatus 13 based on the user authentication history information illustrated in Table 5, despite reception of no response from the authentication apparatus 11. Thus, performing the login process of FIG. 18 enables the image forming apparatus 12 to acquire authorization to perform printing using the print data or original data stored in the terminal apparatus 13, despite the malfunctioning of the print accumulation apparatus 10 and the authentication apparatus 11.

Note that the user will not be provided with authorization to access the terminal apparatus 13 when the authentication history information of the corresponding user does not hold the encryption identifier of the terminal apparatus 13 in step S26, when failure to acquire the IP address due to unsuccessful decryption in step S28, and when authentication failure response is returned in step S30. However, the user is provided with authorization to access the functions of the image forming apparatus 12. This indicates that the image forming apparatus 12 may be able to obtain authorization to access to the functions of the image forming apparatus 12 within an allowable range of the authorization being provided even if the authentication apparatus 11 malfunctions.

On the other hand, when the image forming apparatus 12 receives a response within the predetermined time (the connection is not timeout), the image forming apparatus 12 proceeds, after step S22, with step S32 to determine whether the response indicates successful authentication. When the response does not indicate successful authentication, the image forming apparatus 12 determines that the authentication has failed in step S33, and ends the process.

When the response indicates successful authentication, the image forming apparatus 12 provides the user with authorization such as copying authorization or printing authorization based on the user information of the corresponding user returned together with the authentication response from the authentication apparatus 11 in step S34. In step S35, the image forming apparatus 12 saves the user authentication history information in the image forming apparatus internal user authentication history information illustrated in Table 5, based on the user information of the corresponding user returned together with the authentication response from the authentication apparatus 11.

In step S36, the image forming apparatus 12 determines whether the user information of the corresponding user holds the encryption identifier of the terminal apparatus 13. When the user information of the corresponding user holds the encryption identifier of the terminal apparatus 13, the image forming apparatus 12 decrypts the encryption identifier of the terminal apparatus 13 included in the user information of the corresponding user with a secret key of the corresponding user in step S37.

When the image forming apparatus 12 successfully decrypts the encryption identifier of the terminal apparatus 13 to acquire the IP address, the image forming apparatus 12 provides access authorization to access the terminal apparatus 13 to the user in step S38. In this case, the user is provided with authorization to access the functions of the image forming apparatus 12 and authorization to access the terminal apparatus 13 based on the user information illustrated in Table 4.

Note that the user will not be provided with authorization to access the terminal apparatus 13 when the user information of the corresponding user does not hold the encryption identifier of the terminal apparatus 13 in step S36, and when failure to acquire the IP address due to unsuccessful decryption in step S37. However, the user may be able to acquire authorization to access the functions of the image forming apparatus 12 the within an allowable range of the authorization being provided.

Print Data Returning Process in Terminal Apparatus

Figure 19:
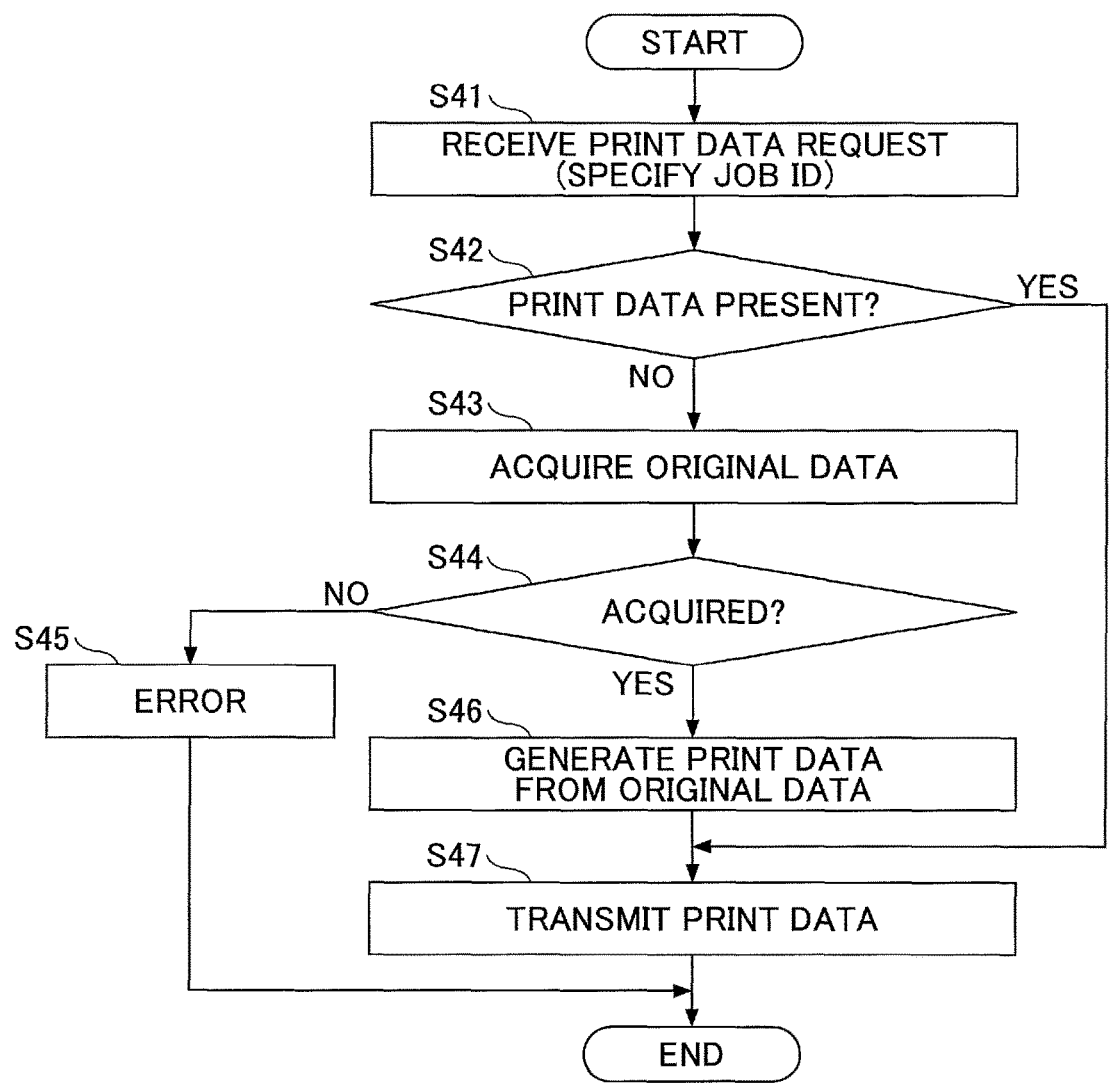
FIG. 19 is a flowchart illustrating an example of a print data returning process in the terminal apparatus.

When the terminal apparatus 13 receives the print data request of step S211 in FIG. 8 or step S312 in FIG. 9, the terminal apparatus 13 performs a process illustrated in FIG. 19. FIG. 19 is a flowchart illustrating an example of a print data returning process in the terminal apparatus.

In step S41, the terminal apparatus 13 receives the print data request specifying the job ID from the image forming apparatus 12. In step S42, the terminal apparatus 13 reads print job information specified by the job ID from the terminal apparatus internal print job information of Table 1.

In step S42, the terminal apparatus 13 refers to a path of the read print job information to determine whether the terminal apparatus 13 accumulates the print data of the specified job ID. When the terminal apparatus 13 accumulates the print data of the specified job ID, the terminal apparatus 13 is able to transmit the print data the storage location of which is indicated by the path to the image forming apparatus 12 in step S47.

On the other hand, when the terminal apparatus 13 does not accumulate the print data of the specified job ID in step S42, the terminal apparatus 13 attempts to acquire original data from the storage location indicated by the path in step S43.

For example, when the original data are deleted or moved by the user, the terminal apparatus 13 fails to acquire the original data from the storage location indicated by the path in step S44. When the terminal apparatus 13 fails to acquire the original data, the terminal apparatus 13 also fails to generate the print data from the original data to transmit the generated print data. Hence, the terminal apparatus 13 transmits an error to the image forming apparatus 12 in step S45. When the terminal apparatus 13 successfully acquires the original data from the storage location indicated by the path ("YES" in step S44), the terminal apparatus 13 generates print data from the original data in step S46. The terminal apparatus 13 transmits the print data generated from the original data to the image forming apparatus 12 in step S47.

As described above, when the terminal apparatus 13 accumulates the print data of the specified job ID, the terminal apparatus 13 transmits the print data to the image forming apparatus 12. On the other hand, when the terminal apparatus 13 accumulates the original data, the terminal apparatus 13 transmits the print data generated from the original data to the image forming apparatus 12.

Outline

The printing system 1 according to the second embodiment enables the image forming apparatus 12 to specify the IP address of the terminal apparatus 13 from the encryption identifier of the terminal apparatus 13 held as the user authentication history information in the image forming apparatus 12 even if one of the print accumulation apparatus 10 and the authentication apparatus 11 has failed.

Further, the printing system 1 according to the second embodiment enables the image forming apparatus 12 to implement secure printing using the authentication because the terminal apparatus 13 is unable to decrypt the encryption identifier of the terminal apparatus 13 without a secret key of the user to obtain the IP address of the terminal apparatus 13. The image forming apparatus 12 may be able to acquire the print data accumulated in the terminal apparatus 13 or the print data generated from the original data accumulated in the terminal apparatus 13 by accessing the terminal apparatus 13 with the specified IP address. In addition, the image forming apparatus 12 may be able to implement secure printing using the authentication by assigning a signature to an access to the terminal apparatus 13.

The present invention is not limited to examples or embodiments disclosed above. Various modifications or alteration may be made without departing from the scope of the claims of the present invention.

For example, the scope of the present invention is not limited to printing applications, and the above-described printing system 1 is an example of an output system. Hence, the scope of the present invention is not limited to the output system that handles the print data or print job information alone. The print accumulation apparatus F102 is an example of an accumulation apparatus. The image forming apparatus F104 is an example of an output apparatus. The authentication history holder F209 is an example of a holder.

The authentication controller F208 is an example of an authentication controller. The print controller F207 is an example of an output controller. The authentication recording medium controller F210 and the authentication recording medium F211 is an example of an encryption unit. The public key of the user is an example of a first key. The secret key of the user is an example of a second key. The print job information is an example of output job information. The terminal apparatus 13 configured to receive a print instruction from the user is an example of a terminal apparatus configured to receive an accumulation instruction from the user. The image forming apparatus 12 configured to output print data based on the print instruction from the user is an example of an output apparatus configured to output the output data based on an output instruction from the user.

The disclosed embodiments may implement outputting data or the like using authentication even if one of an accumulation apparatus and an authentication apparatus has failed.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

The present invention is not limited to the specifically disclosed embodiments, and variations and modifications may be made without departing from the scope of the present invention.

What is claimed is:

1. An output system comprising:
   an accumulation apparatus;
   a terminal apparatus configured to receive an accumulation instruction from a user for printing a print job, and to transmit the print job to the accumulation apparatus, wherein the accumulation apparatus is configured to accumulate first output job information for the print job, wherein the first output job information associates identification information of the user and identification information of the print job; and
   a processor of an output apparatus configured to request that the accumulation apparatus transmit a job list, and responsive to the accumulation apparatus failing to transmit the job list, to request that the terminal apparatus transmit the job list, to request that the terminal apparatus transmit the print job, to receive the print job from the terminal apparatus, and to output data for the print job in accordance with an output instruction from the user,
   the processor configured to hold authentication history information of the user in association with identification information of the user and identification information of the terminal apparatus, the print job being selected by the user among print jobs displayed on the job list,
   the processor configured to request, in the accumulation apparatus the terminal apparatus being identified by the identification information of the terminal apparatus utilizing the identification information of the user and the identification information of the terminal apparatus in association with the authentication history information of the user.

2. The output system according to claim 1, wherein the the processor is
configured to decrypt identification information of the terminal apparatus, which has been encrypted with a first key of the user, with a second key of the user, wherein the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user.

3. The output system according to claim 2, wherein:
the processor decrypts a shared key, which has been encrypted with the first key of the user acquired from the terminal apparatus, with the second key of the user, and wherein the processor acquires encrypted output data specified in second output job information, decrypts the acquired output data with the shared key, and outputs the decrypted output data.

4. The output system according to claim 1, further comprising:
an authentication apparatus configured to authenticate the user, wherein the terminal apparatus, the accumulation apparatus, and the output apparatus are connected via a network, wherein
the processor is configured to decrypt identification information of the terminal apparatus, which has been encrypted with a first key of the user, with a second key of the user, wherein
the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user, wherein
the processor decrypts a shared key, which has been encrypted with the first key of the user acquired from the terminal apparatus, with the second key of the user to acquire encrypted output data specified in second output job information, to decrypt the acquired output data with the shared key, and to output the decrypted output data, and wherein
the authentication apparatus holds information of the user having the identification information of the user in association with the identification information of the terminal apparatus when the accumulation apparatus accumulates the first output job information in accordance with the accumulation instruction, and wherein
the processor holds the information of the user having the identification information of the user in association with the identification information of the terminal apparatus received from the authentication apparatus as the authentication history information of the user when authentication of the user performed by the authentication apparatus has succeeded.

5. The output system according to claim 1, further comprising:
an authentication apparatus configured to authenticate the user, wherein the terminal apparatus, the accumulation apparatus, and the output apparatus are connected via a network, wherein:
the processor is configured to decrypt identification information of the terminal apparatus, which has been encrypted with a first key of the user, with a second key of the user, wherein
the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user, wherein
the processor decrypts a shared key, which has been encrypted with the first key of the user acquired from the terminal apparatus, with the second key of the user to acquire encrypted output data specified in second output job information, to decrypt the acquired output data with the shared key, and to output the decrypted output data, and wherein
the authentication apparatus holds information of the user having the identification information of the user in association with the identification information of the terminal apparatus when the accumulation apparatus accumulates the first output job information in accordance with the accumulation instruction, wherein
the processor holds the information of the user having the identification information of the user in association with the identification information of the terminal apparatus received from the authentication apparatus as the authentication history information of the user when authentication of the user performed by the authentication apparatus has succeeded, and wherein
when the output data requested by the processor is specified by original data at a time of generating the output data in the second output job information, the terminal apparatus generates the output data from the original data to transmit the generated output data to the processor.

6. The output apparatus according to claim 1, wherein the output apparatus further includes:
an authentication apparatus configured to authenticate the user, the terminal apparatus, the accumulation apparatus, the output apparatus, and the authentication apparatus being connected via a network.

7. An output apparatus for use in an output system, the output system including a terminal apparatus configured to receive an accumulation instruction from a user for printing a print job, and to transmit the print job to an accumulation apparatus, wherein the accumulation apparatus is configured to accumulate first output job information for the print job, wherein the first output job information associates identification information of the user and identification information of the print job, the output apparatus including:
a processor configured to request that the accumulation apparatus transmit a job list, and responsive to the accumulation apparatus failing to transmit the job list, to request that the terminal apparatus transmit the job list, to request that the terminal apparatus transmit the print job, to receive the print job from the terminal apparatus, and to output data for the print job in accordance with an output instruction from the user,
the processor configured to hold authentication history information of the user in association with identification information of the user and identification information of the terminal apparatus, the print job being selected by the user among print jobs displayed on the job list, the processor configured to request, in the accumulation apparatus the terminal apparatus being identified by the identification information of the terminal apparatus utilizing the identification information of the user and the identification information of the terminal apparatus in association with the authentication history information of the user.

8. The output apparatus according to claim 7, wherein the processor is configured to decrypt identification information of the terminal apparatus, which has been encrypted with a first key of the user, with a second key of the user, wherein the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user.

9. The output apparatus according to claim 8, wherein:

the processor decrypts a shared key, which has been encrypted with the first key of the user acquired from the terminal apparatus, with the second key of the user, and wherein the processor acquires encrypted output data specified in second output job information, decrypts the acquired output data with the shared key, and outputs the decrypted output data.

10. The output apparatus according to claim 7, wherein:

the processor is configured to decrypt identification information of the terminal apparatus, which has been encrypted with a first key of the user, with a second key of the user, wherein the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user, wherein the processor decrypts a shared key, which has been encrypted with the first key of the user acquired from the terminal apparatus, with the second key of the user to acquire encrypted output data specified in second output job information, to decrypt the acquired output data with the shared key, and to output the decrypted output data, and wherein an authentication apparatus holds information of the user having the identification information of the user in association with the identification information of the terminal apparatus when the accumulation apparatus accumulates the first output job information in accordance with the accumulation instruction, wherein the authentication apparatus is configured to authenticate the user, wherein the terminal apparatus, the accumulation apparatus, and the output apparatus are connected via a network, and wherein the processor holds the information of the user having the identification information of the user in association with the identification information of the terminal apparatus received from the authentication apparatus as the authentication history information of the user when authentication of the user performed by the authentication apparatus has succeeded.

11. The output apparatus according to claim 7, wherein:

the processor is configured to decrypt identification information of the terminal apparatus, which has been encrypted with a first key of the user, with a second key of the user, wherein the processor decrypts the identification information of the terminal apparatus, which has been encrypted with the first key of the user, with the second key of the user, and requests the terminal apparatus identified by the decrypted identification information of the terminal apparatus to perform authentication based on the identification information of the user, wherein the processor decrypts a shared key, which has been encrypted with the first key of the user acquired from the terminal apparatus, with the second key of the user to acquire encrypted output data specified in second output job information, to decrypt the acquired output data with the shared key, and to output the decrypted output data, and wherein an authentication apparatus holds information of the user having the identification information of the user in association with the identification information of the terminal apparatus when the accumulation apparatus accumulates the first output job information in accordance with the accumulation instruction, wherein the authentication apparatus is configured to authenticate the user, wherein the terminal apparatus, the accumulation apparatus, and the output apparatus are connected via a network, wherein the processor holds the information of the user having the identification information of the user in association with the identification information of the terminal apparatus received from the authentication apparatus as the authentication history information of the user when authentication of the user performed by the authentication apparatus has succeeded, and wherein when the output data requested by the processor is specified by original data at a time of generating the output data in the second output job information, the terminal apparatus generates the output data from the original data to transmit the generated output data to the processor.

12. An output method executed in an output system, the output system having an accumulation apparatus, a terminal apparatus, and an output apparatus, the method comprising:

receiving, by the terminal apparatus, an accumulation instruction from a user for printing a print job;

transmitting, by the terminal apparatus, the print job to the accumulation apparatus;

accumulating, by the accumulation apparatus, first output job information for the print job, wherein the first output job information associates identification information of the user and identification information of the print job;

requesting, by the output apparatus, that the accumulation apparatus transmit a job list; and responsive to the accumulation apparatus failing to transmit the job list, the output apparatus to perform the following:

requesting that the terminal apparatus transmit the job list;

requesting that the terminal apparatus transmit the print job;

receiving the print job from the terminal apparatus;

outputting data for the print job in accordance with an output instruction from the user;

holding authentication history information of the user in association with identification information of the user and identification information of the terminal apparatus, the print job being selected by the user among print jobs displayed on the job list; and requesting, in the accumulation apparatus the terminal apparatus being identified by the identification information of the terminal apparatus utilizing the identification information of the user and the identification information of the terminal apparatus in association with the authentication history information of the user.

13. The output method according to claim 12, further comprising:

decrypting identification information of the terminal apparatus, which has been encrypted with a first key of the user, with a second key of the user; and requesting the terminal apparatus identified by the decrypted identification information of the terminal apparatus to perform authentication based on the identification information of the user.

14. The output method according to claim 13, further comprising:

decrypting a shared key, which has been encrypted with the first key of the user acquired from the terminal apparatus, with the second key of the user to acquire encrypted output data specified in second output job information, to decrypt the acquired output data with the shared key, and to output the decrypted output data.

15. The output method according to claim 12, further comprising:

decrypting identification information of the terminal apparatus, which has been encrypted with a first key of the user, with a second key of the user and requesting the terminal apparatus identified by the decrypted identification information of the terminal apparatus to perform authentication based on the identification information of the user;

decrypting a shared key, which has been encrypted with the first key of the user acquired from the terminal apparatus, with the second key of the user to acquire encrypted output data specified in second output job information, to decrypt the acquired output data with the shared key, and to output the decrypted output data;

holding information of the user having the identification information of the user in association with the identification information of the terminal apparatus when the accumulation apparatus accumulates the first output job information in accordance with the accumulation instruction; and holding the information of the user having the identification information of the user in association with the identification information of the terminal apparatus received from an authentication apparatus as the authentication history information of the user when the authentication of the user performed by the authentication apparatus has succeeded, wherein the authentication apparatus authenticates the user, wherein the terminal apparatus, the accumulation apparatus, and the output apparatus are connected via a network.

16. The output method according to claim 12, further comprising:

decrypting identification information of the terminal apparatus, which has been encrypted with a first key of the user, with a second key of the user and requesting the terminal apparatus identified by the decrypted identification information of the terminal apparatus to perform authentication based on the identification information of the user;

decrypting a shared key, which has been encrypted with the first key of the user acquired from the terminal apparatus, with the second key of the user to acquire encrypted output data specified in second output job information, to decrypt the acquired output data with the shared key, and to output the decrypted output data;

holding information of the user having the identification information of the user in association with the identification information of the terminal apparatus when the accumulation apparatus accumulates the first output job information in accordance with the accumulation instruction;

holding the information of the user having the identification information of the user in association with the identification information of the terminal apparatus received from an authentication apparatus as the authentication history information of the user when the authentication of the user performed by the authentication apparatus has succeeded, wherein the authentication apparatus authenticates the user, wherein the terminal apparatus, the accumulation apparatus, and the output apparatus are connected via a network; and generating the output data from the original data to transmit the generated output data to an output controller when the output data requested by the output controller are specified by original data at a time of generating the output data in the second output job information.

* * * * *